(12) United States Patent
Lee

(10) Patent No.: US 12,529,927 B2
(45) Date of Patent: Jan. 20, 2026

(54) OPTICAL FILM

(71) Applicant: LMS Co., Ltd., Pyeongtaek-si (KR)

(72) Inventor: Seongsu Lee, Pyeongtaek-si (KR)

(73) Assignee: LMS Co., Ltd., Pyeongtaek-si (KR)

( * ) Notice: Subject to any disclaimer, the term of this patent is extended or adjusted under 35 U.S.C. 154(b) by 57 days.

(21) Appl. No.: 18/628,808

(22) Filed: Apr. 8, 2024

(65) Prior Publication Data

US 2024/0337876 A1    Oct. 10, 2024

(30) Foreign Application Priority Data

Apr. 6, 2023  (KR) .................. 10-2023-0045498

(51) Int. Cl.
*G02F 1/1335*  (2006.01)
*G02B 5/04*    (2006.01)
*G02F 1/13357* (2006.01)

(52) U.S. Cl.
CPC ....... *G02F 1/133607* (2021.01); *G02B 5/045* (2013.01); *G02F 1/133603* (2013.01); *G02F 1/133614* (2021.01)

(58) Field of Classification Search
CPC ......... G02F 1/133607; G02F 1/133614; G02F 1/133603; G02B 5/0278; G02B 5/045; F21V 5/008
USPC ....................................................... 362/331
See application file for complete search history.

(56) References Cited

U.S. PATENT DOCUMENTS

| | | | |
|---|---|---|---|
| 7,220,026 B2 * | 5/2007 | Ko .......... | G02B 5/045 |
| | | | 362/339 |
| 7,334,920 B2 | 2/2008 | Chang | |
| 11,347,103 B1 | 5/2022 | Cheng | |
| 11,402,692 B2 * | 8/2022 | Chen ..... | G02B 6/0051 |
| 12,222,534 B1 * | 2/2025 | Lee ........ | G02B 6/0053 |
| 12,222,595 B2 * | 2/2025 | Park ........ | G02F 1/133615 |
| 2009/0167981 A1 * | 7/2009 | Arai ........ | G02F 1/133606 |
| | | | 349/62 |
| 2018/0172897 A1 | 6/2018 | Min et al. | |
| 2020/0116919 A1 | 4/2020 | Lee et al. | |
| 2020/0379159 A1 * | 12/2020 | Li ........... | G02B 6/0053 |
| 2021/0124217 A1 | 4/2021 | Choi et al. | |
| 2021/0157443 A1 | 5/2021 | Zeuner et al. | |
| 2021/0397041 A1 | 12/2021 | Kashiwagi | |
| 2022/0057547 A1 | 2/2022 | Kim et al. | |

(Continued)

FOREIGN PATENT DOCUMENTS

| | | |
|---|---|---|
| JP | 2008003515 A | 1/2008 |
| JP | 2018517934 A | 7/2018 |

(Continued)

*Primary Examiner* — Laura K Tso
(74) *Attorney, Agent, or Firm* — NKL LAW; Jae Youn Kim

(57) ABSTRACT

An optical film according to various embodiments of the present invention may include a base portion; a pyramid pattern layer wherein a plurality of pyramid patterns having a vertex angle being in the vertex angle range of 60° or larger to 160° or smaller is formed on one surface of the base portion; and a diffusion layer wherein a plurality of optical protrusion patterns formed on the other surface of the base portion. the pyramid pattern layer is formed to have a refractive index greater than or equal to a refractive index of the diffusion layer, and a haze value of the diffusion layer is 15% or higher.

20 Claims, 16 Drawing Sheets

(56) References Cited

U.S. PATENT DOCUMENTS

| | | | | |
|---|---|---|---|---|
| 2022/0163716 A1* | 5/2022 | Kim | ................... | G02B 5/0242 |
| 2022/0179264 A1* | 6/2022 | Chen | ................ | G02F 1/133603 |
| 2023/0288753 A1* | 9/2023 | Shiau | ................ | G02F 1/133615 |
| 2024/0027830 A1* | 1/2024 | Lee | ................... | G02F 1/133603 |
| 2025/0004317 A1* | 1/2025 | Park | ................. | G02F 1/133615 |

FOREIGN PATENT DOCUMENTS

| | | |
|---|---|---|
| JP | WO2018181966 A1 | 10/2018 |
| JP | 2020-076978 A | 5/2020 |
| JP | 2022035921 A | 3/2022 |
| JP | 2023-013921 A | 1/2023 |
| KR | 10-2017-0127983 A | 11/2017 |
| KR | 20200001867 A | 1/2020 |
| KR | 10-2021-0075059 A | 6/2021 |
| KR | 10-2022-0061635 A | 5/2022 |
| KR | 10-2023-0024718 A | 2/2023 |

\* cited by examiner

OPTICAL FILM

CROSS-REFERENCE TO RELATED APPLICATION(S)

This application is based on and claims priority under 35 U.S.C. 119 to Korean Patent Application No. 10-2023-0045498, filed on Apr. 6, 2023, in the Korean Intellectual Property Office, the disclosure of which is herein incorporated by reference in its entirety.

TECHNICAL FIELD

Various embodiments of the present specification relate to an optical film utilizing for a liquid crystal display (LCD) device.

BACKGROUND

As a light source, mini-LEDs (light emitting diodes) and/or micro-LEDs, which have advantages such as miniaturization, weight reduction, and/or low power consumption, are actively used for a liquid crystal display (LCD) device. It is possible to implement clearer image quality through using the mini-LEDs or the micro-LEDs as the light source over using a conventional light source because each chip can constitute an individual pixel or a light source thereby eliminating restrictions on the size and the shape of the display. Along with miniaturization of LED chips, research for a backlight unit is also actively underway to complement LED light characteristics when the LED chips are utilized as the light source of the backlight unit.

A direct-backlight unit that uses the mini-LEDs or the micro-LEDs as a light source may include a diffusion sheet to change light from a point light source to a surface light source and prism sheets to concentrate light thereby improving brightness. As the light source is placed on a flat surface in the direct-type backlight unit, a thick diffusion sheet or a plurality of stacked diffusion sheets may be required for the direct-type backlight unit to prevent the shape of the light source (e.g., the shape of the mini-LED or the micro-LED) from being visible on the liquid crystal panel, in other words, to shield the shape of the light source. The direct-type backlight unit may include a prism sheet with a triangular pillar-shaped prism pattern layer formed on one side of the sheet to increase the brightness of light from the surface light source that passes through the diffusion sheet.

Unfortunately, if the diffusion sheet is thickened to prevent the shape of the light source from being visible on the liquid crystal panel, there is limitation for thinning the liquid crystal display (LCD) device. In addition, the brightness of the liquid crystal display (LCD) may be greatly decreased due to the thick diffusion sheet. Accordingly, by laminating at least one diffusion sheet and/or at least one prism sheet, the degree of shielding can be increased without forming a thick diffusion sheet while preventing reduction of the brightness. As an example, an optical film may include one diffusion sheet and two prism sheets being laminated. However, even in the case of laminating one diffusion sheet and two prism sheets, the brightness reduction may be occurred depending on the laminating configuration.

SUMMARY

It is an object to provide an optical film for a liquid crystal display (LCD) having excellent performance to prevent the shape of the light source from being visible on the liquid crystal panel (referred to as 'shielding performance') while maintaining high brightness (referred to as 'brightness performance') without using a thick diffusion sheet according to various embodiments of the present invention.

It is another object to provide a thin backlight unit by not including a thick diffusion sheet for the backlight according to various embodiments of the present invention.

It is yet another object to provide a backlight unit including an optical film having excellent shielding performance with respect to mini-LEDs or micro-LEDs as well as excellent brightness performance according to various embodiments of the present invention.

According to an embodiment of the invention, there is provided that an optical film comprises that a first sheet including a first base portion; a pyramid pattern layer where a plurality of pyramid patterns is formed on one surface of the first base portion; and a first diffusion layer where a plurality of optical protrusion patterns formed on the other surface of the first base portion; a second sheet disposed over the first sheet and including a second base portion; a first prism pattern layer where a plurality of prism patterns is formed on one surface of the second base portion; and a second diffusion layer where a plurality of optical protrusion patterns having adhesiveness are formed on the other surface of the second base portion; and a third sheet disposed over the second sheet and including a third base portion; a second prism pattern layer where a plurality of prism patterns is formed on one surface of the third base portion; and a third diffusion layer where a plurality of optical protrusion patterns having adhesiveness are formed on the other surface of the third base portion. The pyramid pattern layer is formed to have a refractive index greater than or equal to a refractive index of the first diffusion layer. And a haze value of the first diffusion layer is 15% or higher. And, the first sheet, the second sheet, and third sheet are laminated by the optical protrusion patterns having adhesiveness of the second and third diffusion layers.

In an embodiment, the plurality of optical protrusion patterns of the first diffusion layer are configured to be a matte pattern for the optical film in the present invention.

In an embodiment, the plurality of optical protrusion patterns of the first diffusion layer are configured to be a reverse prism pattern for the optical film in the present invention.

In an embodiment, the plurality of pyramid patterns of the pyramid pattern layer are configured to be intaglio for the optical film in the present invention.

In an embodiment, a perpendicular cross-section of the plurality of pyramid patterns which is parallel to a height direction of the optical film is an isosceles triangle for the optical film in the present invention.

In an embodiment, a vertex angle of the plurality of pyramid patterns of the pyramid pattern layer is in the vertex angle range of 60° or larger to 160° or smaller for the optical film in the present invention.

In an embodiment, a vertex angle of the plurality of pyramid patterns of the pyramid pattern layer is in the vertex angle range of 80° degree or larger to 130° or smaller for the optical film in the present invention.

In an embodiment, a deviation between a refractive index of the pyramid pattern layer and a refractive index of the second diffusion layer is 0.05 or less for the optical film in the present invention.

In an embodiment, a deviation between a refractive index of the first prism pattern layer and a refractive index of the third diffusion layer is 0.05 or larger for the optical film in the present invention.

In an embodiment, a pitch of the pyramid pattern layer is formed to have a predetermined multiple deviation from an integer multiple of a pitch of the first prism pattern layer and a pitch of the second prism pattern layer for the optical film in the present invention.

According to another embodiment of the invention, there is provided that an optical film comprises that a base portion; a pyramid pattern layer where a plurality of pyramid patterns having a vertex angle being in the vertex angle range of 60° or larger to 160° or smaller is formed on one surface of the base portion; and a diffusion layer where a plurality of optical protrusion patterns formed on the other surface of the base portion. The pyramid pattern layer is formed to have a refractive index greater than or equal to a refractive index of the diffusion layer. And a haze value of the diffusion layer is 15% or higher.

In another embodiment, the plurality of optical protrusion patterns of the diffusion layer are configured to be a matte pattern for the optical film in the present invention.

In another embodiment, the plurality of optical protrusion patterns of the diffusion layer are configured to be a reverse prism pattern for the optical film in the present invention.

In another embodiment, a vertex angle of the plurality of pyramid patterns of the pyramid pattern layer is in the vertex angle range of 80° or larger to 130° or smaller for the optical film in the present invention.

In another embodiment, the plurality of pyramid patterns of the pyramid pattern layer are configured to be intaglio for the optical film in the present invention.

According to yet another embodiment of the invention, there is provided that a backlight unit comprises that a light source; a color conversion sheet; and an optical film disposed over the color conversion sheet further comprising a fourth sheet including a fourth base portion; a pyramid pattern layer where a plurality of pyramid patterns with a vertex angle being in the vertex angle range of 60° or larger to 160° or smaller is formed on one surface of the fourth base portion; and a fourth diffusion layer where a plurality of optical protrusion patterns formed on the other surface of the first base portion; a fifth sheet disposed over the fourth sheet and including a fifth base portion; a third prism pattern layer where a plurality of prism patterns is formed on one surface of the second base portion; and a fifth diffusion layer where a plurality of optical protrusion patterns having adhesiveness are formed on the other surface of the fifth base portion; and a sixth sheet disposed over the fifth sheet and including a sixth base portion; a fourth prism pattern layer where a plurality of prism patterns is formed on one surface of the sixth base portion; and a sixth diffusion layer where a plurality of optical protrusion patterns having adhesiveness are formed on the other surface of the sixth base portion. The pyramid pattern layer is formed to have a refractive index greater than or equal to a refractive index of the first diffusion layer. And a haze value of the first diffusion layer is 15% or higher. And the fourth sheet, the fifth sheet, and sixth sheet are laminated by the plurality of optical protrusion patterns having adhesiveness of the fifth and the sixth diffusion layers.

In yet another embodiment, the plurality of optical protrusion patterns of the fourth diffusion layer are configured to be a matte pattern for the backlight unit in the present invention.

In yet another embodiment, the plurality of optical protrusion patterns of the first diffusion layer are configured to be a reverse prism pattern for backlight unit in the present invention.

In yet another embodiment, the plurality of pyramid patterns of the pyramid pattern layer are configured to be intaglio for the backlight unit in the present invention.

In yet another embodiment, a pitch of the pyramid pattern layer is formed to have a predetermined multiple deviation from an integer multiple of a pitch of the first prism pattern layer and a pitch of the second prism pattern layer for the backlight unit in the present invention.

DETAILED DESCRIPTION

Figure 1:
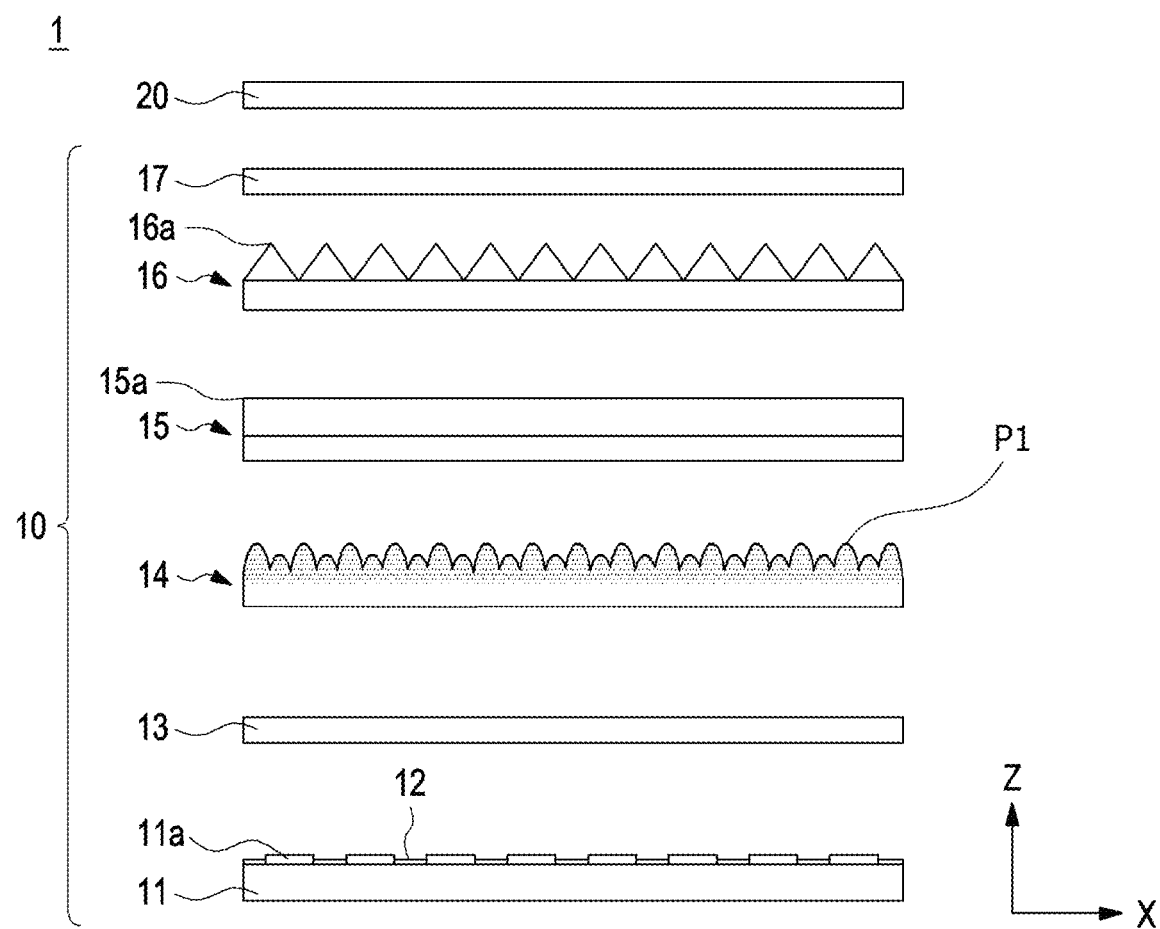
FIG. 1 is a drawing showing a liquid crystal display (LCD) device including a diffusion sheet according to a certain embodiment.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

According to various embodiments, each component (e.g., module or program) of the above-described components may include a single or plural entity, and some of the plurality of entities may be separately placed in other components. According to various embodiments, one or more of the components or operations described above may be omitted, or one or more other components or operations may be added. Multiple components (e.g., modules or programs) may be alternatively or additionally integrated into a single component. In this case, the integrated component may perform one or more functions of each component of the plurality of components in the same or similar manner as those performed by the corresponding component of the plurality of components prior to the integration. According to various embodiments, operations performed by a module, program, or other component may be executed sequentially, in parallel, iteratively, or heuristically, or one or more of the operations may be executed in a different order, or omitted. Alternatively, one or more other operations may be added.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

FIG. 1 is a drawing showing a liquid crystal display (LCD) device 1 including a diffusion sheet according to a certain embodiment. In the detailed description below, the length direction (longitudinal direction) of the liquid crystal display (LCD) device 1 is referred to as the 'Y-axis direction', the width direction (lateral direction) is referred to as the 'X-axis direction', and/or the height direction (thickness direction) can be defined as 'Z-axis direction.' In a certain embodiment, the direction in which a component is oriented may be referred to as 'negative/positive (−/+)' in addition to the Cartesian coordinate system illustrated in the drawing. For example, referring to FIG. 1, when a second prism sheet 16 is disposed over a first prism sheet 15, it may be defined that the second prism sheet 16 is arranged to be disposed in the '+Z-axis direction (or first direction)' over the first prism sheet 15. Also, for another example, referring to FIG. 4A, it can be defined that one surface of the first base portion 112 is a surface facing the '+Z axis direction (or first direction)', and the other surface is a surface facing the '−Z axis direction (or second direction).' For explaining as to the direction, in case where 'negative/positive (−/+)' used in the Cartesian coordinate system as shown in FIG. 1 below is not stated, corresponding coordinate axis can be interpreted as pointing in the + direction unless differently defined. For example, 'X-axis direction' can be interpreted as pointing to the +X-axis direction, and 'Y-axis direction' can be interpreted as pointing to the +Y-axis direction. 'Z-axis direction' can be interpreted as pointing to the +Z-axis direction. For explaining as to the direction, directing toward one of the three axes of the Cartesian coordinate system may include directing in a direction parallel to the axis. Note that this is based on the Cartesian coordinate system described in the drawings for simple explanation, and that the description of directions or components does not limit the various embodiments of the present specification.

Referring to FIG. 1, the liquid crystal display (LCD) device 1 may include a backlight unit 10 and a liquid crystal panel 20. According to various embodiments, the backlight unit 10 is provided to face the back surface (a surface facing-Z axis direction) of the liquid crystal panel 20 to emit light to the liquid crystal panel 20. The backlight unit 10 may include a substrate 11 including a light source 11a, a color conversion sheet 13, diffusion sheets 14, 17 and prism sheets 15, 16. The backlight unit 10 may further include a reflective polarizing sheet, although not shown in the drawing.

The light source 11a may be placed on one side of the substrate 11 as a component for emitting light on the back of the liquid crystal panel 20. A light emitting diode (referred to as LED) may be applicable for the light source 11a. For example, the light source 11a may include a plurality of LED chips. Here, the LED may include material such as InGaN and GaN, etc. Depending on the size of the LED chip, the LED is classified into a large LED (chip size: 1,000 μm or larger), a middle LED (chip size: 300-500 μm), and a small LED (chip size: 200-300 μm), a mini-LED (chip size: 100-200 μm), and a micro-LED (chip size: 100 μm or less). For the light source 11a of the present specification, the LED may include any one of the large LED, the medium LED, the small LED, the mini-LED, and the micro-LED. For example, the embodiment of FIG. 1 is illustrated to include the mini-LED. Light emitted from the light source 11a can be emitted to the back surface of the liquid crystal panel 20 (+Z-axis direction). Light emitted from the light source 11a may pass through the color conversion sheet 13 and enter the diffusion sheet 14.

According to one embodiment, a reflective sheet 12 may be formed on the surface of the substrate 11. The reflective sheet 12 may include material such as $BaSO_4$, $TiO_2$, $CaCO_3$, $SiO_2$, $Ca_3(SO_4)_2$ or may include material such as Ag. It may be deposited or coated on the substrate 11 and also be disposed between one light source 11a to another light source 11a. The reflective sheet 12 can reflect light which was reflected to the substrate 11 due to the interface reflection of the light emitted from the light source 11a while transmitting through the color conversion sheet 13, diffusion sheets 14, 17 and prism sheets 15, 16 back to the direction of emission of the light. Through this, loss of light can be minimized. In other words, the reflective sheet 12 can perform light recycling.

The color conversion sheet 13 converts color of light emitted from the light source 11a. For an example, the color of light for the mini-LED or the micro-LED may be blue light (450 nm). In this case, the blue light needs to be converted to white light. Accordingly, the color conversion sheet 13 can transmit the blue light emitted from the light source 11a and simultaneously convert the blue light into the white light.

Diffusion sheets 14, 17 can uniformly diffuse incident light from the color conversion sheet 13. The diffusion sheets 14, 17 where curable resin solution (e.g., urethane acrylate, epoxy acrylate, ester acrylate, or at least one selected from or mixed of ester acrylate and radical generating monomer) added with light diffusion beads is deposited can induce light diffusion by the light diffusion beads. In addition, the diffusion sheets 14, 17 may be formed a protrusion pattern (or a protrusion portion) having uniform or non-uniform size of shape (e.g., spherical, hemispherical, or elliptical) to promote the diffusion of light.

The diffusion sheets 14, 17 may include at least one of a lower diffusion sheet 14 or an upper diffusion sheet 17. The lower diffusion sheet 14 may be disposed between the color conversion sheet 13 and the prism sheet 15, and the upper diffusion sheet 17 may be disposed between the prism sheet 16 and the liquid crystal panel 20. If the backlight unit 10 further includes a reflective polarizing sheet, the upper diffusion sheet 17 may be disposed between the prism sheet 16 and the reflective polarizing sheet.

The prism sheets 15, 16 can concentrate incident light by an optical pattern formed on the surface of the prism sheets and then, output the concentrated light to the liquid crystal panel 20. The prism sheets 15, 16 may include a transparent base film a prism pattern layer formed on an upper surface (a surface facing +Z-axis direction) of the base film. The prism pattern layer may be formed to be an optical pattern layer having a triangular array with a predetermined slope angle (e.g., 45°) to improve brightness in the surface direction. Prism patterns of the prism pattern layer may be a triangular pillar shape and one surface of the triangular pillar may be disposed to face the base film. The cross section of each of the prism patterns may be a triangle.

According to one embodiment, the prism sheets 15, 16 may construct a complex prism sheet structure with a first prism sheet 15 and a second prism sheet 16. Here, the second prism sheet 16 may be disposed to overlap the first prism sheet 15. In the first prism sheet 15, a plurality of first prism patterns may be arranged side by side with each other. Each first prism pattern may have a structure extending in one direction. For example, vertex lines 15a of each of the first prism patterns may be formed to extend toward the X-axis direction. Similarly, in the second prism sheet 16, a plurality of second prism patterns may also be arranged side by side with each other. Each second prism pattern may have a structure extending in one direction. For example, the vertex lines 16a of each of the second prism patterns may be formed to extend toward the Y-axis direction perpendicular to the X-axis. Here, the extension direction of the first prism patterns and the extension direction of the second prism patterns are shown as facing the X-axis and Y-axis for the convenience of explanation. However, it is not limited to the illustrated embodiment, and may be oriented in a direction other than the X-axis or Y-axis.

The reflective polarizing sheet (not illustrated) is provided on the prism sheets 15, 16 and the upper diffusion sheet 17. It may play a role to transmit light of some polarization and reflect downward the light of other polarization as to the light concentrated by the prism sheets 15, 16 and diffused by the upper diffusion sheet 17.

The liquid crystal panel 20 may refract light emitted from the light source 11a to a predetermined pattern according to an electrical signal. Refracted light can construct an image by passing through a color filter and a polarizing filter placed on the front of the liquid crystal panel 20.

Components included in the liquid crystal display (LCD) display 1 of FIG. 1 can be assembled with other components to be overlapped and stacked in the height direction (Z-axis direction). For example, for the liquid crystal display (LCD) device 1 according to a certain embodiment as shown in FIG. 1, the discretely manufactured lower diffusion sheet 14, the first prism sheet 15 and the second prism sheet 16 may be overlapped and stacked in the height direction (Z-axis direction).

Figure 2:
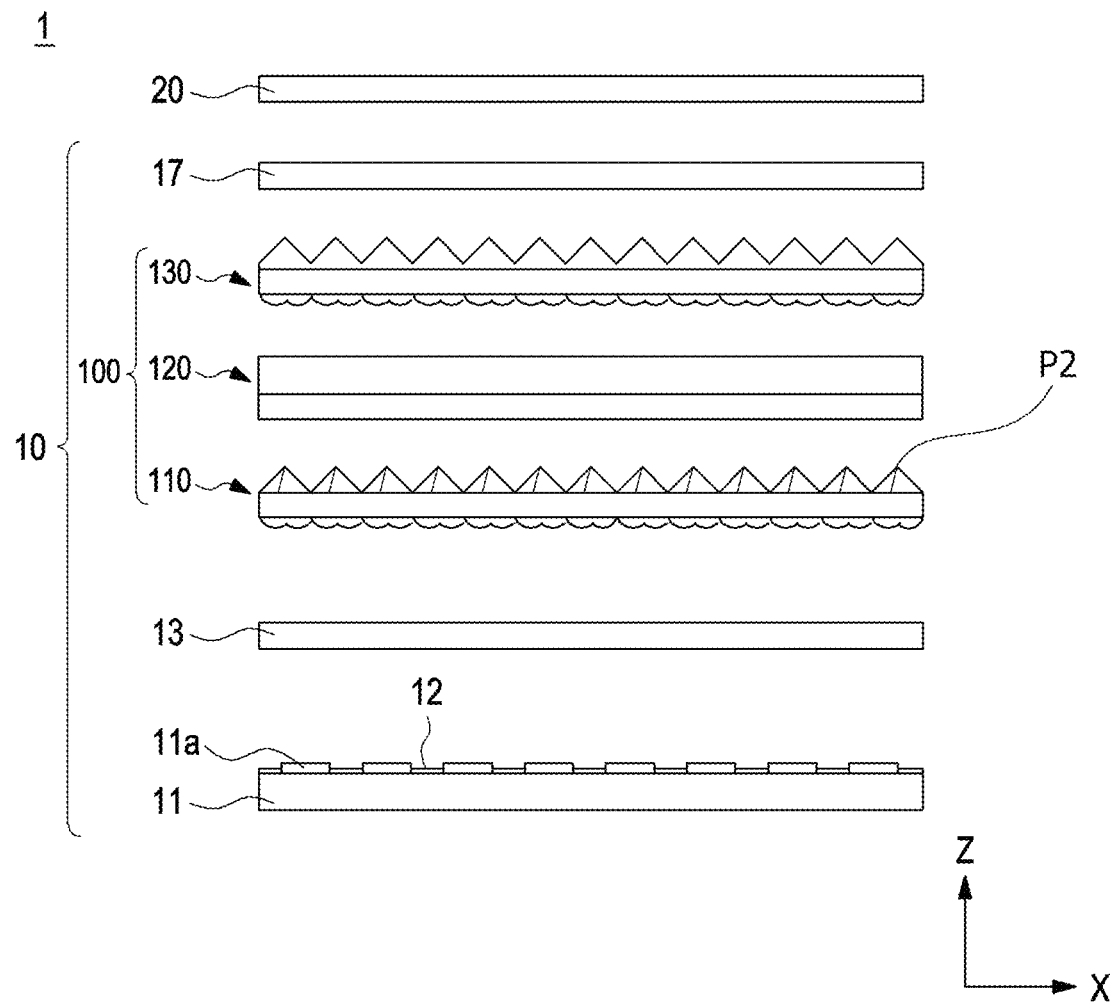
FIG. 2 is a drawing showing a liquid crystal display (LCD) device utilizing an optical film according to an embodiment of the present invention.
Figure 3:
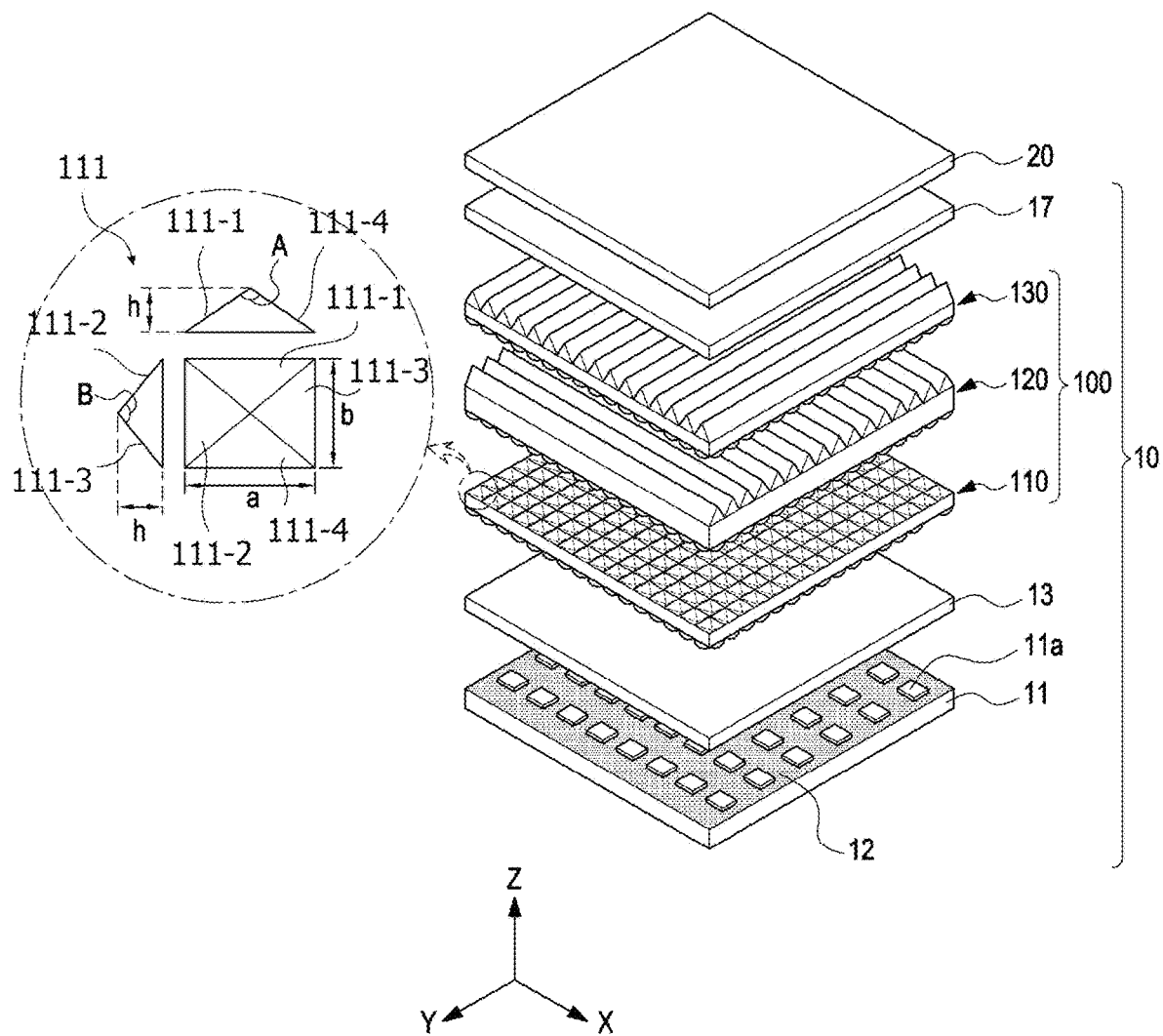
FIG. 3 is a perspective view showing a liquid crystal display (LCD) device utilizing an optical film according to an embodiment of the present invention.

FIG. 2 is a drawing showing a liquid crystal display (LCD) device 1 utilizing an optical film according to an embodiment of the present invention. FIG. 3 is a perspective view showing a liquid crystal display (LCD) device 1 utilizing an optical film according to an embodiment of the present invention.

Referring to FIG. 2, a liquid crystal display (LCD) device 1 according to an embodiment of the present invention may include a backlight unit 10 and a liquid crystal panel 20. The backlight unit 10 may include a substrate 11 including a light source 11a and an optical film 100. A reflective sheet 12 may be formed on one side of the light source 11a. According to one embodiment of the present invention, the backlight unit 10 may further include a color conversion sheet 13 and/or a diffusion sheet 17. According to another embodiment, the backlight unit 10 may exclude at least one of these components (e.g., the diffusion sheet 17) or may add one or more other components (e.g., a reflective polarizing sheet (not illustrated)).

Below, description of components that overlaps with FIG. 1 will be omitted. The liquid crystal display (LCD) device 1 of the present invention may include the optical film 100 of the present invention as a distinctive feature rather than discretely including the lower diffusion sheet 14, the first prism sheet 15 and the second prism sheet 16 of FIG. 1. In other words, the optical film 100 can be provided to replace the lower diffusion sheet 14, the first prism sheet 15, and the second prism sheet 16 of FIG. 1 for the liquid crystal display (LCD) device 1 of the present invention. However, it should be noted that the present invention is not limited to this, and an optical film 100 may be additionally provided in addition to the lower diffusion sheet 14, or a sheet other than the lower diffusion sheet 14 may be additionally provided. For example, although the back light unit 10 in FIG. 2 is shown to include a substrate 11 including a light source 11a, a color conversion sheet 13, an optical film 100, and a diffusion sheet 17, a shielding sheet may be further included between the optical film 100 and the color conversion sheet 13. In this case, it is possible to have various applications of embodiments where the shielding sheet disposed between the optical film 100 and the color conversion sheet 13 may be configured to be a single sheet such as the lower diffusion sheet 14 of FIG. 1 or a laminated sheet formed by laminating a plurality of sheets.

In the present specification, 'the optical film 100' may refer to include a first sheet 110 with a plurality of pyramid patterns formed on one side, a second sheet 120 disposed on the first sheet 110 with a plurality of prism patterns formed on one side, and a third sheet 130 disposed on the second sheet 120 with a plurality of prism patterns formed on one side as shown in FIGS. 2 and 3. In FIGS. 2 and 3, the first sheet 110, the second sheet 120, and the third sheet 130 are shown as spaced apart from each other for the convenience of explanation. However, the first sheet 110, the second sheet 120 and the third sheet 130 may be laminated each other unlike as depicted in FIGS. 2 and 3. In the present specification, the 'lamination' may mean that two different sheets are adhered by a surface including a pattern with an adhesive resin formed on at least one of two surfaces of the two different sheets facing each other. For example, the lamination may be that a pattern with a semi-cured adhesive resin formed on one of two surfaces of the two different sheets facing each other is needed and then, the two different sheets are adhered by the pattern being completely cured while the other surface is attached to the pattern. In addition, for example, semi-cured adhesive resins are formed on two surfaces of the two different sheets facing each other and then, the two different sheets are adhered by the adhesive resins being completely cured after both surfaces were attached. The laminated optical film 100 may provide a thinner sheet with excellent shielding performance over an embodiment of simply stacked sheets for the backlight unit.

The plurality of pyramid (or quadrangular pyramid) patterns of the first sheet 110 may refract and/or reflect light transmitted from the light source 11a and transmit it to the second sheet 120. The second sheet 120 may be formed where a plurality of prisms (or triangular pillars) extends in the length direction (Y-axis direction) of the liquid crystal display (LCD) device 1 and protrude in the height direction (Z-axis direction). The second sheet 120 may transmit light passing through the first sheet 110 to the third sheet 130. The third sheet 130 may be formed where a plurality of prisms (or triangular pillars) extends in the width direction (X-axis direction) of the liquid crystal display (LCD) device 1 and protrude in the height direction (Z-axis direction). The third sheet 130 may transmit the light passing through the second sheet 120 to the liquid crystal panel 20. The optical film 100 may have advantage to obtain shielding performance for blocking shape of the light source 11a as well as high brightness performance since light from light source 11a incident to the optical film 100 is diffused and/or concentrated while sequentially passing the first sheet 110, the second sheet 120 and the third sheet 130. In an embodiment disclosed in FIG. 3, the prism pattern of the second sheet 120 is shown to be extended in the length direction (Y-axis direction) of the liquid crystal display (LCD) device 1 and the prism pattern of the third sheet 130 is shown to be extended in the width direction (X-axis direction) of the liquid crystal display (LCD) device 1. However, it is not limited as stated above. Unlikely, the prism pattern of the second sheet 120 may be extended in the width direction (X-axis direction) of the liquid crystal display (LCD) device 1 and the prism pattern of the third sheet 130 may be extended in the length direction (Y-axis direction) of the liquid crystal display (LCD) device 1. It is sufficient for the prism pattern of the second sheet 120 and the prism pattern of the third sheet 130 to be orthogonal to each other. Referring to FIG. 3, the pyramid pattern layer 111 of the first sheet 110 may have a pyramid pattern (a pyramid pattern 111a in FIG. 4A) including four side surfaces 111-1, 111-2, 111-3, 111-4 with bottom sides having a first directional length a and a second directional length b, respectively, a height h and vertex angles of A and B and a bottom surface. The dimensions of the pyramid pattern may be set differently depending on the embodiment.

Figure 4A:
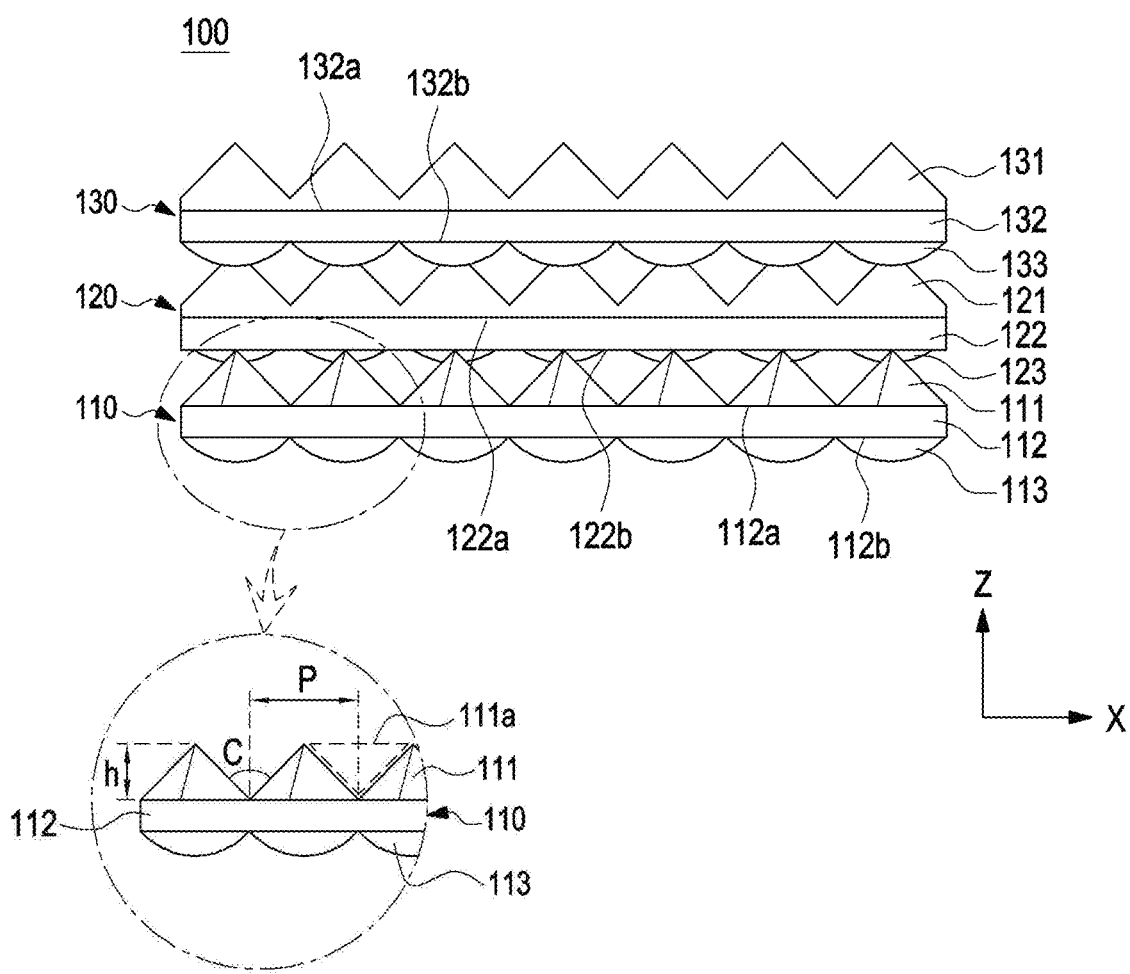
FIG. 4A is a cross-sectional view showing an optical film according to an embodiment of the present invention.
Figure 4B:
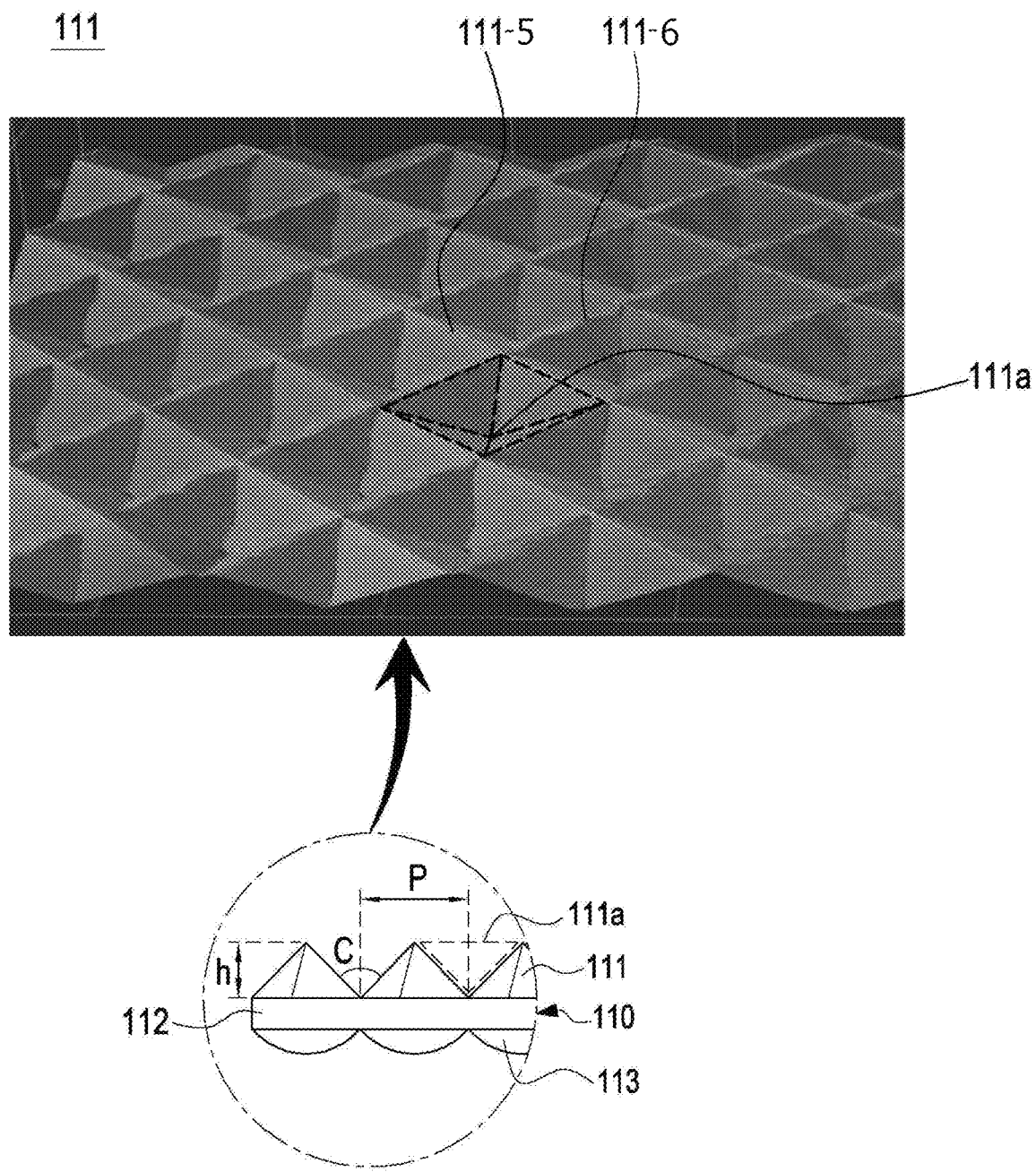
FIG. 4B and FIG. 4C are perspective views showing a pyramid pattern according to an embodiment of the present invention.
Figure 4C:
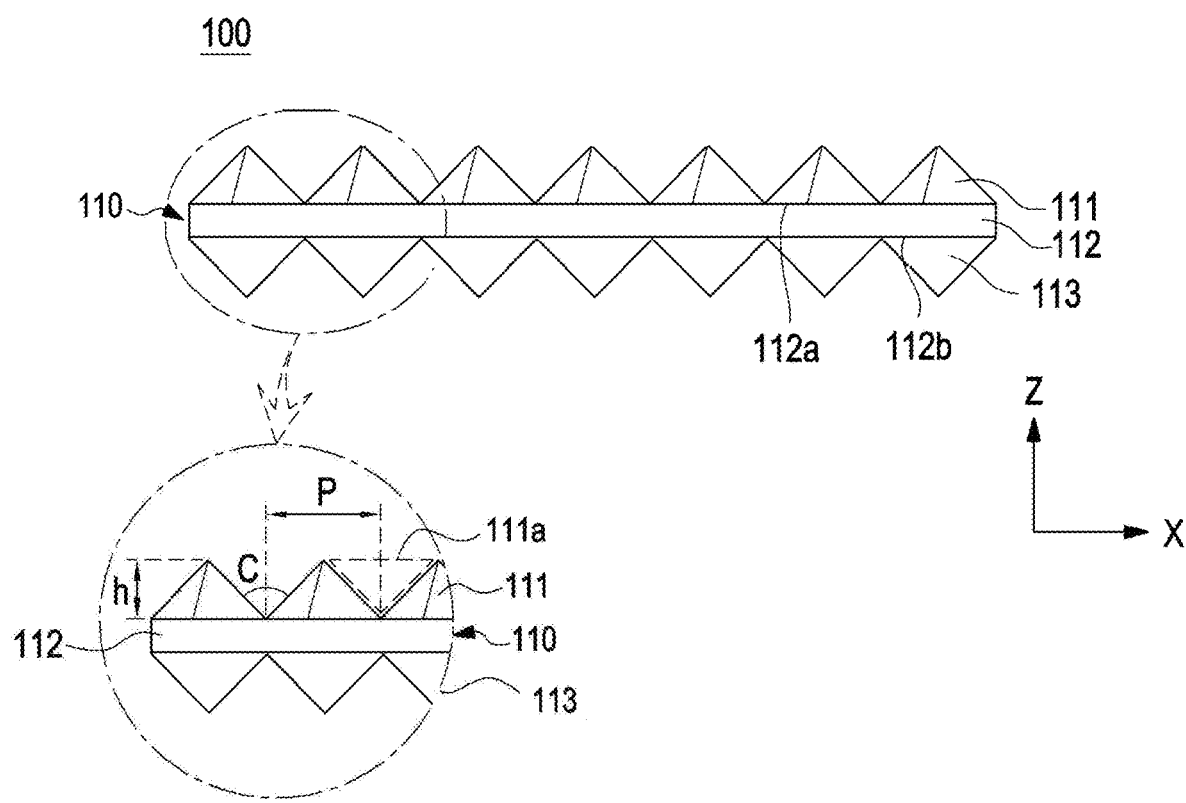
Figure 4D:
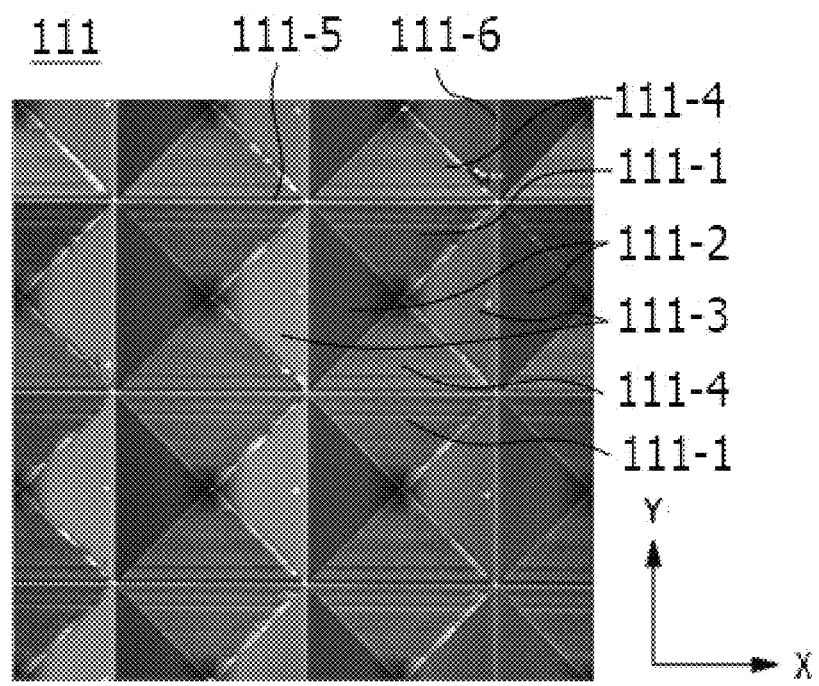
FIG. 4D is an image showing a top view of a pyramid pattern layer before lamination according to an embodiment of the present invention.
Figure 4E:
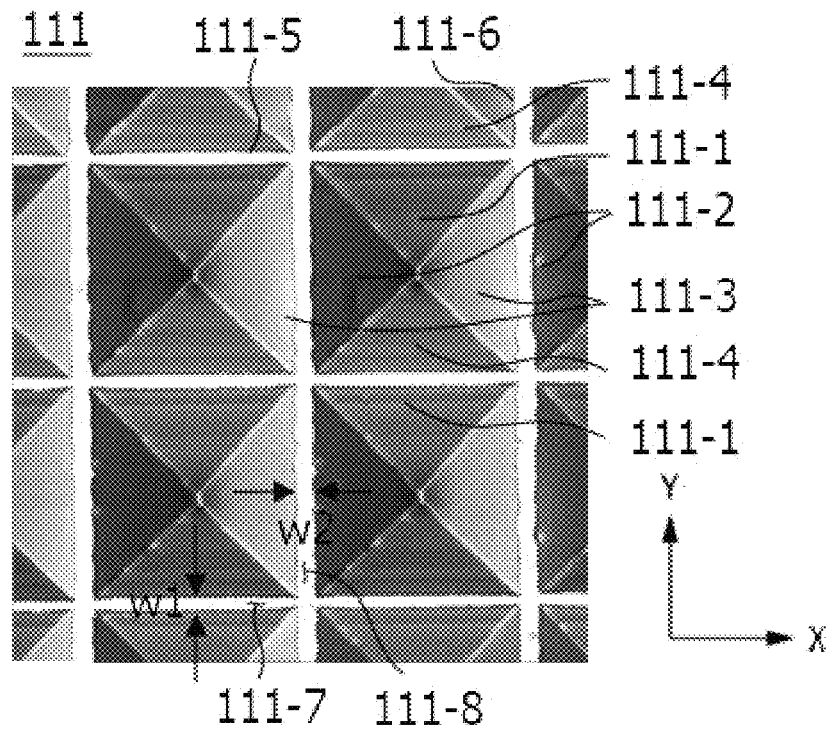
FIG. 4E is an image showing a top view of a pyramid pattern layer after lamination according to an embodiment of the present invention.

Below, the optical film 100 will be described in more detail with reference to FIG. 4A. FIG. 4A is a cross-sectional view showing an optical film according to an embodiment of the present invention. FIG. 4B and FIG. 4C are perspective views showing a pyramid pattern according to an embodiment of the present invention. FIG. 4D is an image showing a top view of a pyramid pattern layer before lamination according to an embodiment of the present invention. FIG. 4E is an image showing a top view of a pyramid pattern layer after lamination according to an embodiment of the present invention.

Referring to FIG. 4A, the optical film 100 according to an embodiment of the present invention may include the first sheet 110, the second sheet 120, and the third sheet 130. The first sheet 110, the second sheet 120, and the third sheet 130 may include a first base portion 112, a second base portion 122, and a third base portion 132, respectively. In this case, the first base portion 112, the second base portion 122, and the third base portion 132 are made of transparent material capable of transmitting light. For example, it may include polycarbonate series, polysulfone series, polyacrylate series, polystyrene series, polyvinyl chloride series, polyvinyl alcohol series, polynorbornene series, and polyester series material. For a specific example, the first base portion 112, the second base portion 122, and/or the third base portion 132 may be made of polyethylene terephthalate (PET) or polyethylene naphthalate. For example, the first base portion 112, the second base portion 122, and the third base portion 132 may be made of PET having a thickness of about 10 µm to about 50 µm and more specifically, about 24 µm to about 40 µm. In various experimental examples including the viewing angle distribution described later in the diagrams of FIG. 6A and below, the first base portion 112, the second base portion 122, and the third base portion 132 may be made of PET having a thickness of 24 µm, respectively. However, it should be noted that the thickness of the first base portion 112, the second base portion 122, and the third base portion 132 is not limited to the above examples.

As previously described for the embodiment in FIG. 3, the first sheet 110 may include a pyramid pattern 111a having a quadrangular pyramid shape with corresponding four side surfaces 111-1, 111-2, 111-3, 111-4 formed by the first directional length 'a' and the second directional length 'b', the height 'h', a pitch 'P' and the vertex angles of A and B and formed on one surface 112a of the first base portion 112. The optical film 100 may include a plurality of pyramid patterns 111a having a plurality of columns in a first direction and a plurality of rows in a second direction perpendicular to the first direction.

Referring to FIGS. 4A, 4B, and 4C, the pyramid pattern 111a may be an intaglio pattern according to one embodiment. The pyramid pattern 111a may refer to an intaglio pattern where quadrangular pyramid shaped grooves are formed regularly, and may be defined by the four side surfaces 111-1, 111-2, 111-3, 111-4. Here, the four side surfaces may be the same or different in the shape of triangles. The dimensions of vertex angle A and vertex B may be set by the lateral length a, the longitudinal length b, and the height of each cross-section of the pyramid pattern 111a. According to one embodiment, the vertex angle A and the vertex angle B may be formed as substantially the same angle, and accordingly, the lateral length a and the longitudinal length b of the pyramid pattern 111a may also be set to be substantially the same. Here, the fact that the vertex angle A and the vertex angle B are substantially the same may mean that the vertex angle A and the vertex angle B have the same value within a process deviation (e.g., about 10%).

In addition, the height h and the pitch P for the pyramid pattern 111a are set by a vertex angle C. The optical film 100 may include the pyramid pattern 111a having a vertical cross section which is parallel to the height direction (Z-axis direction) of triangular or trapezoidal shape. The vertex angle C may be defined by an angle between two opposing side surfaces of the four side surfaces of the pyramid pattern 111a.

According to one embodiment, the vertex angle C for the pyramid pattern 111a may be defined between 60° or larger and 160° or smaller. For example, the vertex angle C may be 90°.

FIG. 4D shows the pyramid pattern layer before the first sheet 110 is laminated to the second sheet 120 and FIG. 4E shows the pyramid pattern where the first sheet 110 is separated from the second sheet 120 after the first sheet 110 and the second sheet 120 was laminated. Referring to FIG. 4C, the pyramid pattern layer 111 before lamination may include a first barrier rib 111-5 formed between the first side surface 111-1 and the fourth side surface 111-4 for defining a boundary between the first side surface 111-1 and the fourth side surface 111-4 and a second barrier rib 111-6 formed between the second side surface 111-2 and the third side surface 111-3 for defining a boundary between the second side surface 111-2 and the third side surface 111-3. The barrier rib 111-5 and the second barrier rib 111-6 may be the uppermost part of the first sheet 110. According to one embodiment, the first barrier rib 111-5 may be formed to be parallel to the first direction and the second barrier rib 111-6 may be formed to be parallel to the second direction, but noted that it is not necessarily limited. Referring to FIG. 4E, if the pyramid pattern layer 111 disposed on the upper surface of the first sheet 110 is laminated to the rear surface of the second sheet 120 (e.g., the second diffusion layer 123 on the rear surface of the second sheet 120), tips of the first barrier rib 111-5 and the second barrier rib 111-6, which are the uppermost part of the pyramid pattern layer 111, may be pressed. Accordingly, the tip of the first barrier rib 111-5 may be deformed to form a first flat portion 111-7 with a predetermined width W1 and the tip of the second barrier rib 111-6 may be deformed to form a second flat portion 111-8 with predetermined width W2. According to one embodiment, the width W1 of the first flat portion 111-7 and the width W2 of the second flat portion 111-8 may be substantially the same.

Figure 5A:
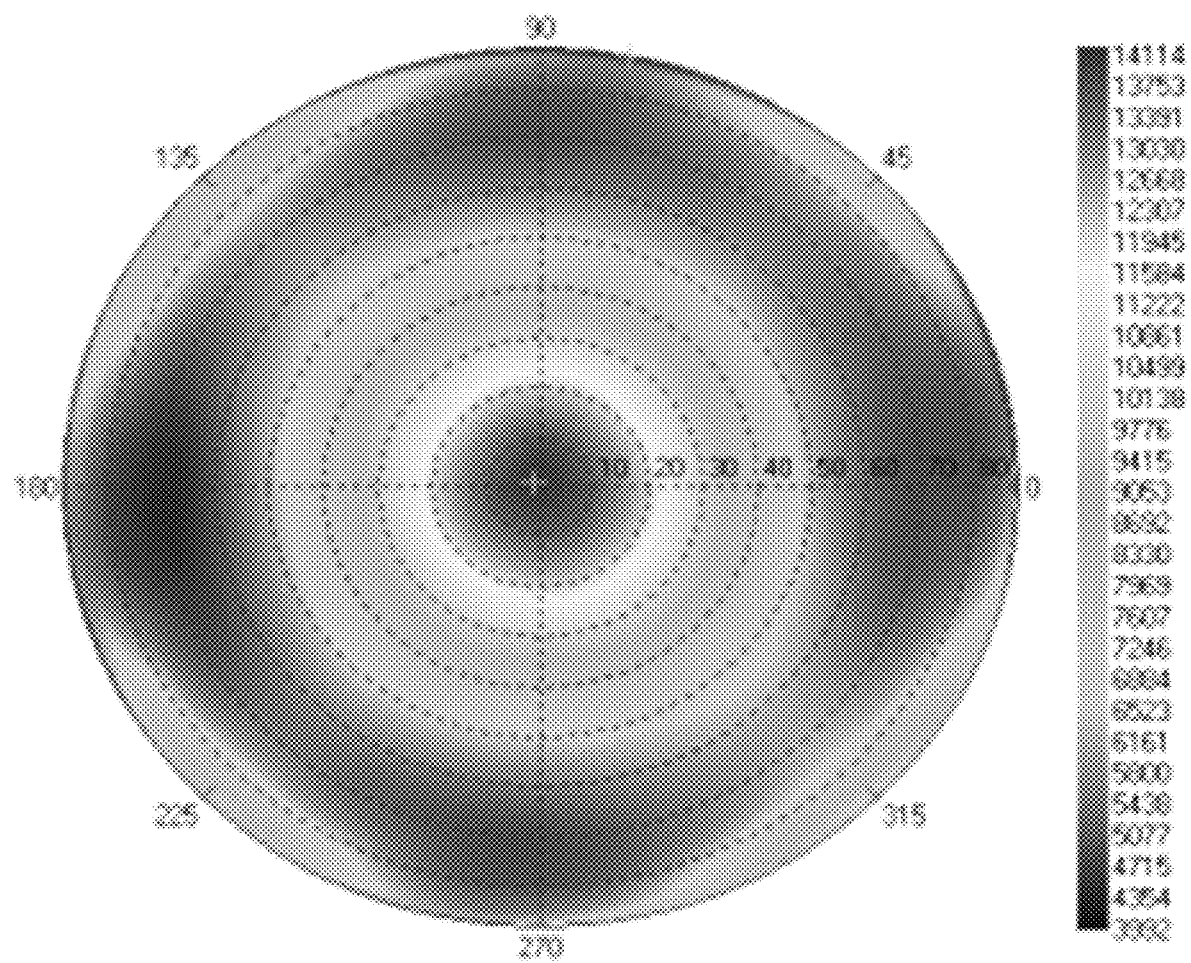
FIG. 5A and FIG. 5B are diagrams showing the viewing angle with respect to the vertex angle of the optical film according to an embodiment of the present invention.
Figure 5B:
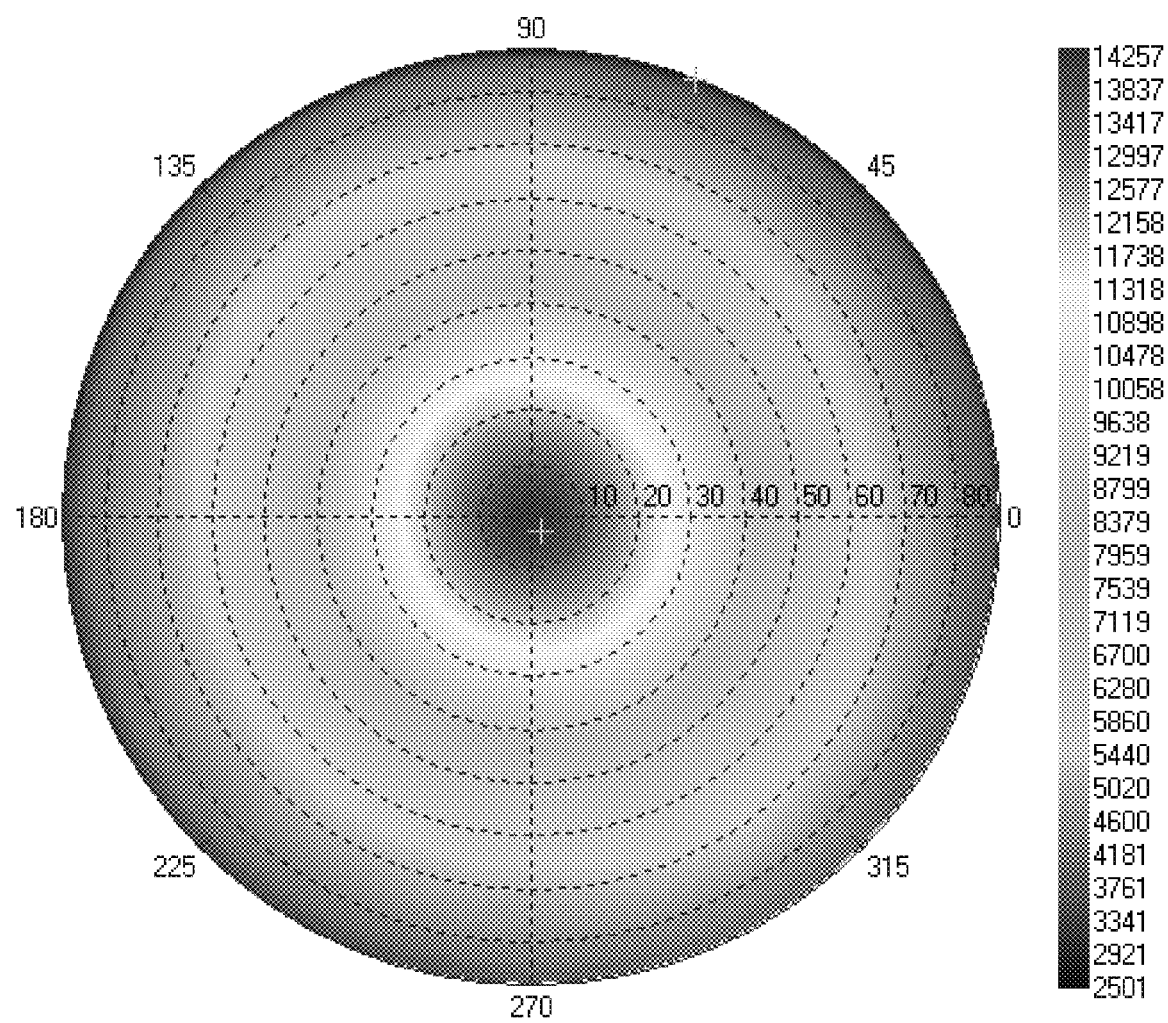
Figure 6A:
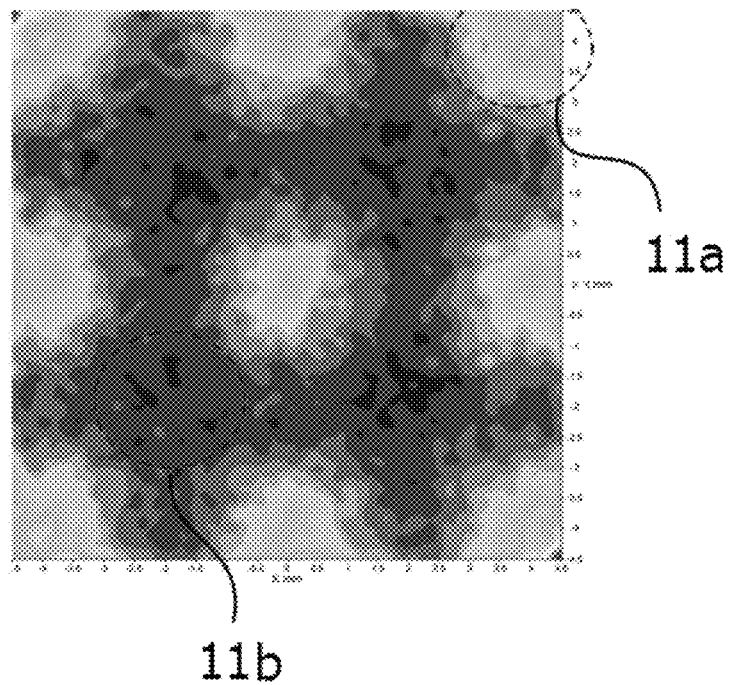
FIG. 6A and FIG. 6B are diagrams showing the intensity (degree of shielding) with respect to the vertex angle of the optical film according to an embodiment of the present invention.
Figure 6B:
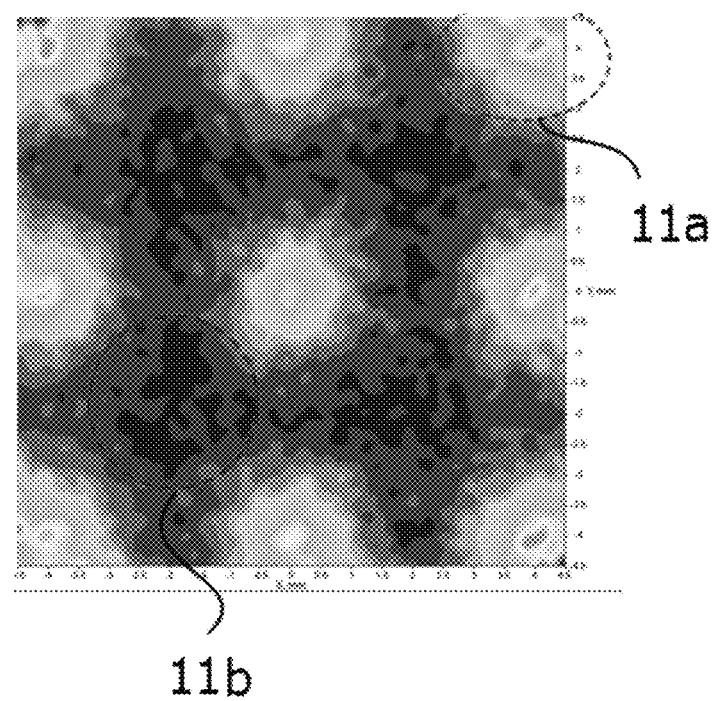

FIG. 5A and FIG. 5B are diagrams showing the viewing angle with respect to the vertex angle of the optical film according to an embodiment of the present invention. FIG. 6A and FIG. 6B are diagrams showing the intensity (degree of shielding) with respect to the vertex angle of the optical film according to an embodiment of the present invention.

Referring to FIG. 5A and FIG. 5B, the viewing angle distribution and the brightness with respect to the vertex angle may be explained. FIG. 5A may represent the viewing angle distribution and the brightness measurement results when the pyramid pattern has a vertex angle of 90° and FIG. 5B may represent the viewing angle distribution and the brightness measurement results when the pyramid pattern has a vertex angle of 130°. In FIGS. 5A and 5B, it is shown that the chief ray of light passes through the center of the diagram and the marginal ray of light passes through the periphery. The brightness may be shown as various color distribution according to the light amount of the chief ray of light and the light amount of the marginal ray of light. Referring to FIGS. 5A and 5B, it can be seen that the brightness at the center is high and the brightness is gradually decreased from the center to the periphery. However, in FIG. 5A, it can be seen that the brightness is increased at the edge of the periphery. FIG. 5B shows that light is concentrated at the center compared to FIG. 5A. As the vertex angle of the pyramid pattern layer 111 becomes larger within the specified range, light can be concentrated at the center because the light diffusivity for light incident to the optical film 100 is reduced further. As the vertex angle becomes smaller, loss of brightness can be increased because the light diffusivity is increased. In other words, the light diffusivity may mean the probability that light is reflected and returned within the liquid crystal display (LCD) device 1, in other words, it is the probability that it is recycled. As the vertex angle is decreased, the probability of light recycling may be increased thereby resulting in an increase in the degree of shielding (and an increase in the brightness loss rate).

According to various embodiments of the present invention, it is possible to control light in four quadrant directions in the periphery by including the pyramid pattern layer 111. According to an embodiment of the present invention, the pyramid pattern layer 111 may include a pyramid pattern 111a whose vertex angle, which is the angle between two opposing triangles, is 90° or larger and 130° or smaller. According to one embodiment, when the vertex angle of the pyramid pattern 111a is formed at an angle of at least 90°, the shielding performance can be satisfied as shown in FIG. 6A and when the vertex angle is smaller than 90°, hot spot visibility (HSV), which is a phenomenon where the light source 11a is visible, may be increased. Referring to FIG. 6A and FIG. 6B, the intensity (degree of shielding) with respect to the vertex angle can be explained. FIG. 6A shows the intensity (degree of shielding) when the pyramid pattern has a vertex angle of 90° and FIG. 6B shows the intensity (degree of shielding) when the pyramid pattern has a vertex angle of 130°. In FIG. 6A, it can be seen that the visibility of a plurality of light sources 11a spaced at a predetermined distance is reduced (or in a given range, as the vertex angle is decreased, the degree of shielding is increased because the brightness loss is increased as the probability of light recycling is increased thereby the light diffusivity is increased). In FIG. 6B, it can be seen that the visibility is increased because the dark area distribution around the light sources 11a, 11b is clearer comparing to FIG. 6A (or as the vertex angle in the specified range becomes larger, the degree of shielding is reduced because the light is concentrated toward the center as the light diffusivity is decreased).

The pyramid pattern layer 111 may be formed of a plurality of pyramid patterns and may be regularly arranged on one surface of the first sheet 110. Because a plurality of pyramid patterns may be corresponded 1:1 to the light source 11a formed on the substrate 11 or be arranged in a configuration where they at least partially overlap, a point light source emitted from the light source may be diffused as a surface light source. On the other hand, because the light from the light source 11a is separated (or light diffusion) by the diffusion effect of the optical film 100, hot spot visibility (HSV) due to concentration of light may be reduced. A first diffusion layer 113 having a plurality of optical protrusion patterns may be formed on the other surface 112b of the first base portion 112. The first diffusion layer 113 may include the optical protrusion pattern to cause light diffusion by adding light diffusion beads to curable resin solution (e.g., urethane acrylate, epoxy acrylate, ester acrylate, or at least one selected from or mixed of ester acrylate and radical generating monomer). In addition, the first diffusion layer 113 may be manufactured to include the optical protrusion pattern by using all treatment methods to increase turbidity further including matte treatment to increase turbidity by creating a rough surface and bead treatment to increase turbidity using beads such as glass or polymer. In various experimental examples including the viewing angle distribution described later in images of FIG. 8, the first diffusion layer 113 may have a haze value of at least 15% as an example.

Meanwhile, when the haze value of the first diffusion layer 113 is implemented at 15% or more, not only the shielding effect but also the brightness may be improved. For example, it is possible to achieve high brightness by forming the optical protrusion pattern to be a reverse prism pattern shown in FIG. 4C. The liquid crystal display (LCD) device 1 according to various embodiments of the present invention does not separately include the lower diffusion sheet 14 of FIG. 1 but it may replace the lower diffusion sheet 14 disposed on the lower surface of the first sheet 110 with the first diffusion layer 113.

According to one embodiment, the refractive index of the pyramid pattern layer 111 for the first sheet 110 may be relatively greater than or equal to the refractive index of the first diffusion layer 113. This is to improve the degree of shielding. For example, when the refractive index of the first diffusion layer 113 where light is incident on the first sheet 110 is 1.49, the refractive index of the pyramid pattern layer 111 where light is emitted is set to be 1.49 or higher thereby reducing the hotspot visibility and improving the shielding performance.

The second sheet 120 may include a first prism pattern layer 121 where a plurality of prism patterns is formed on one surface 122a of the second base portion 122 and is extended parallelly in the longitudinal direction of the liquid crystal display (LCD) device 1. The cross-section of the first prism pattern layer 121 may be triangle. For example, the plurality of prism patterns included in the first prism pattern layer 121 may be formed with a pitch of c and a height of d. The third sheet 130 may include a second prism pattern layer 131 where a plurality of prism patterns is formed on one surface 132a of the third base portion 132 and is extended parallelly in the lateral direction of the liquid crystal display (LCD) device 1. The cross-section of the second prism pattern layer 131 may be triangle. For example, the plurality of prism patterns included in the second prism pattern layer 131 may be formed with a pitch of e and a height of f. Here, the plurality of prism patterns included in the first prism pattern layer 121 and the plurality of prism patterns included in the second prism pattern layer 131 may be extended in directions perpendicular to each other and be formed to have the same pitch and height. However, it is not necessarily limited to this and may vary depending on the embodiment. In addition, the other surface 122b of the second base portion 122 of the second sheet 120 may include a second diffusion layer 123 including a plurality of optical protrusion patterns. The other surface 132b of the third base portion 132 of the third sheet 130 may include a third diffusion layer 133 including a plurality of optical protrusion patterns.

The second diffusion layer 123 and the third diffusion layer 133 may be substantially the same configuration as the first diffusion layer 113 formed on the other surface 112b of the first base portion 112 of the first sheet 110. The second diffusion layer 123 and the third diffusion layer 133 may be manufactured by using all treatment methods to increase turbidity including matte treatment to increase turbidity by creating a rough surface and bead treatment to increase turbidity using beads such as glass or polymer. For example, in various experimental examples including the viewing angle distribution described later in images of FIG. 8, the second diffusion layer 123 may have a haze value of 3% and the third diffusion layer 133 may have a haze value of 40% as examples.

The first sheet 110 and the second sheet 120 may be attached by lamination of the pyramid pattern layer 111 of the first sheet 110 and the second diffusion layer 123 of the second sheet 120 and the second sheet 120 and the third sheet 130 may be attached by lamination of the first prism pattern layer 121 of the second sheet 120 and the third diffusion layer 133 of the third sheet 130. In this case, the second diffusion layer 123 and the third diffusion layer 133 may be formed, for example, to include a plurality of optical protrusion patterns (matte patterns) with adhesive (e.g., adhesive resin). It is possible to manufacture a laminated sheet by initially bonding each other with approximately 50% cured state (e.g., semi-cure) rather than 100% cured state and then, cured to 100%.

Figure 7:
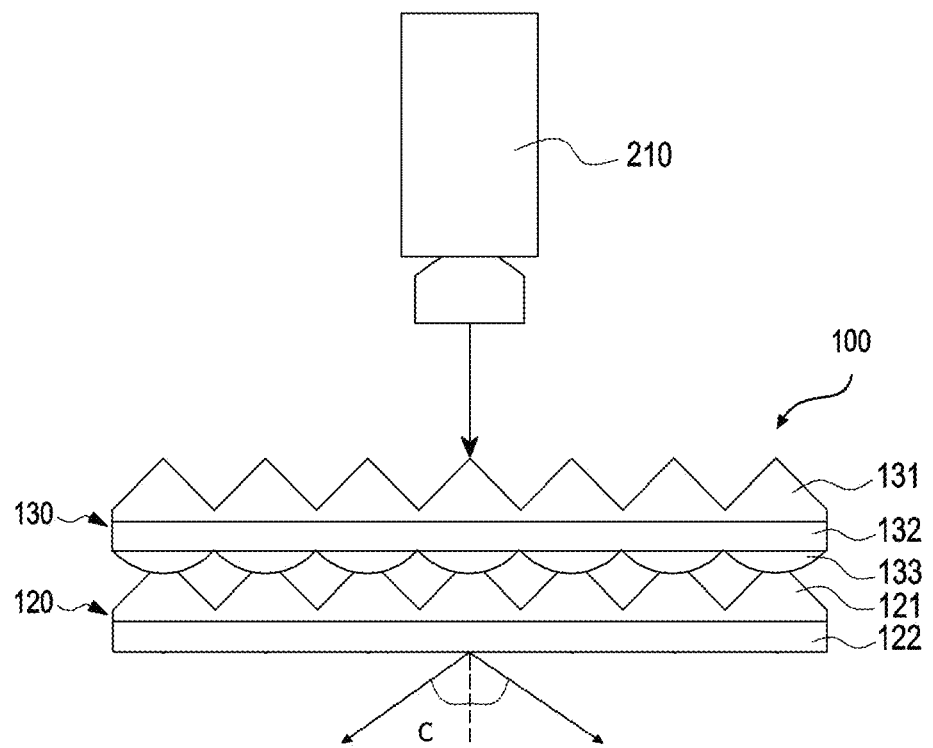
FIG. 7 is a drawing showing the configuration of an experiment for measuring brightness according to an embodiment of the present invention.

FIG. 7 is a drawing showing the configuration of an experiment for measuring brightness according to an embodiment of the present invention. Referring to FIG. 7, the configuration of the experiment for measuring the brightness may include the optical film 100 and a light measurement device 210. Here, the optical film 100 may be represented by the second sheet 120 and the third sheet 130 laminated together and the first sheet 110 may be omitted. The optical measurement device 210 may be a high-speed spectroscopic measurement system such as a colorimetric luminance meter. Although not shown in the drawing, a backlight unit including a light source may be disposed on the opposite side of the optical measurement device 210 with respect to the optical film 100.

As shown in FIG. 7, the optical measurement device 210 can measure light incident to the optical film 100 in the height direction (Z-axis direction). At this time, to obtain high brightness for the liquid crystal display (LCD) device 1, the brightness around 0° must be high in the viewing angle data measured by the optical measurement device 210. It was possible to find through experimental results that the brightness around 0° became the highest when the light passing through the second sheet 120 and the third sheet 130 was incident at a specific angle (C) for the optical film 100. In other words, the brightness of the liquid crystal display (LCD) device 1 may become the highest when the light passing through the lower surface of the laminated body of the second sheet 120 and the third sheet 130 (e.g., the other surface 122b of the second sheet 120) is incident at a specific angle (C).

For example, in an embodiment where the second base portion 122 and the third base portion 132 have a thickness of 24 μm, respectively, when the prism pitch c of the first prism pattern layer 121 formed on one surface 122a of the second base portion 122 may be 50 μm; a height d may be formed to be 40 μm; and the second diffusion layer 123 may have a haze value of 3% and the prism pitch e of the second prism pattern layer 131 formed on one surface 132a of the third base portion 132 may be 50 μm; a height f may be formed to be 40 μm; and the third diffusion layer 133 may have a haze value of 40%, an angle (C) of the incident light where the brightness around 0° becomes the highest can be set to 59°. In other words, it can have the highest brightness value when the light passing through the lower surface of the laminated body of the second sheet 120 and the third sheet 130 (e.g., the other surface 122b of the second sheet 120) is incident to the angle of +59° or −59°.

According to various embodiments of the present invention, the optical film 100 may be provided to include the first sheet 110 designed to improve the shielding performance in the direction where light is incident as well as for the light passing through the lower surface of the laminated body of the second sheet 120 and the third sheet 130 (e.g., the other surface 122b of the second sheet 120) to be incident at a specific angle (C). As shown in FIGS. 2 to 6B, the optical film 100 according to one embodiment may include the first sheet 110 further including the first base portion 112, the pyramid pattern layer 111 where a plurality of pyramid patterns are formed on one surface 112a of the first base portion 112, and the first diffusion layer 113 formed on the other surface 112b of the first base portion 112; the second sheet 120 disposed over the first sheet 110 further including the second base portion 122, the first prism pattern layer 121 where a plurality of prism patterns are formed on one surface 122a of the second base portion 122, and the second diffusion layer 123 formed on the other surface 122b of the second base portion 122; and the third sheet 130 disposed over the second sheet 120 further including the third base portion 132, the second prism pattern layer 131 where a plurality of prism patterns are formed on one surface 132a of the third base portion 132, and the third diffusion layer 133 formed on the other surface 132b of the third base portion 132.

Comparing an embodiment in FIG. 1 and embodiments in FIG. 2 to FIG. 6B, it is difficult to shield the light source 11a for the liquid crystal display (LCD) device 1 in FIG. 1 because it only includes simply the lower diffusion sheet 14 and it may not be designed to form an angle of light incident to the prism sheets 15, 16 to achieve the best brightness performance. On the other hand, for the liquid crystal display (LCD) device 1 of FIGS. 2 to 6B, the first sheet 110, the second sheet 120, and the third sheet 130 may be manufactured in a configuration where the first sheet 110, the second sheet 120, and the third sheet 130 are laminated together. Particularly, because the first sheet 110 is provided with the first diffusion layer 113 on the other surface 112b of the first base portion 112 and the pyramid pattern on one surface 112a, it is possible to improve the hotspot visibility (HSV) caused by concentration of light (improving the shielding performance) while diffusing the light. In addition, considering the specifications of the laminated second sheet 120 and third sheet 130, the first sheet 110 may refract and/or reflect light to be incident from a point (e.g., P2 in FIG. 2) where the light meets the lower surface 122b of the second sheet 120 to the second sheet 120 with a specific angle (improving the brightness performance) by properly controlling the configuration of the first diffusion layer 113 formed on the other surface 112b of the first base portion 112 and the pyramid pattern formed on one surface 112a.

According to various embodiments, the refractive index of the pyramid pattern layer 111 and the second diffusion layer 123 may be formed to have a deviation of 0.05 or less. Since the refractive index of the pyramid pattern layer 111 and the second diffusion layer 123 is formed to have a deviation of 0.05 or less, it can be advantageous to maintain light recycling characteristics while preventing damage to the pyramid pattern during laminating. According to various embodiments, the refractive index of the first prism pattern layer 121 and the third diffusion layer 133 may be formed to have a deviation of 0.05 or larger. The decrease in brightness can be minimized by forming the refractive index of the first prism pattern layer 121 and the third diffusion layer 133 to have a deviation of 0.05 or larger.

According to one embodiment, when the pitch of the pyramid pattern layer of the first sheet 110 compared to the pitch of the first prism pattern layer 121 and the second prism pattern layer 131 included in the second sheet 120 and the third sheet 130 is an integer multiple, a moiré phenomenon may be occurred. Accordingly, the pitch of the pyramid pattern layer 111 of the first sheet 110 may be set to have a predetermined multiple deviation from an integer multiple of the pitches of the first prism pattern layer 121 and the second prism pattern layer 131 included in the second sheet 120 and the third sheet 130. For example, when the pitch of the first prism pattern layer 121 and the second prism pattern layer 131 included in the second sheet 120 and the third sheet 130 is formed to be 50 μm, respectively, the pitch p of the pyramid pattern layer 111 of the first sheet 110 can be formed to be 85 μm and thus, a multiple deviation of 15% may be formed.

Figure 8A:
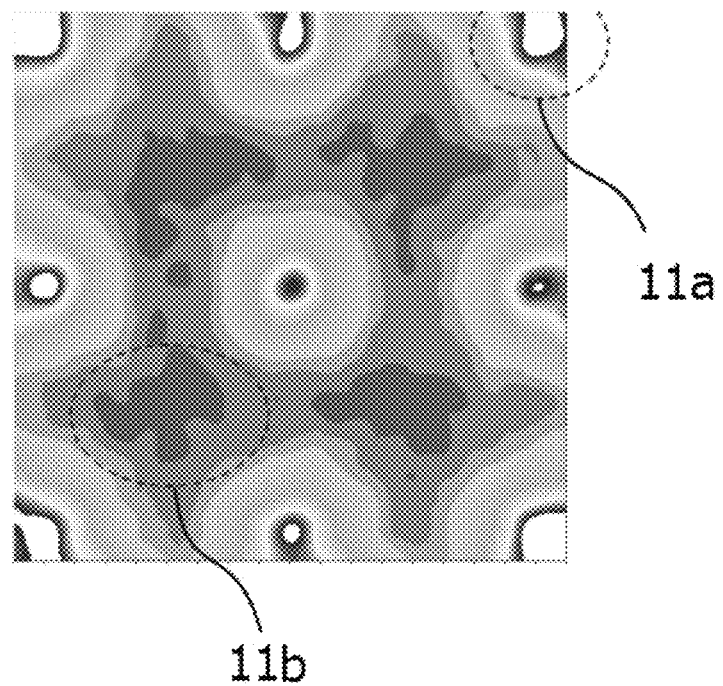
FIG. 8A and FIG. 8B are images showing the optical characteristic between the liquid crystal display (LCD) device in the embodiment of FIG. 1 and the liquid crystal display (LCD) devices in the embodiments of FIG. 2 to FIG. 6B.
Figure 8B:
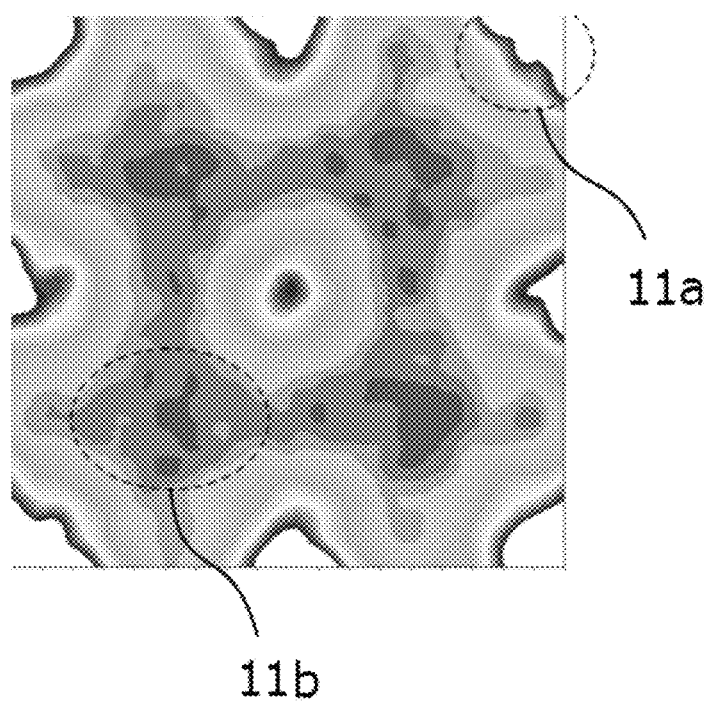
Figure 9:
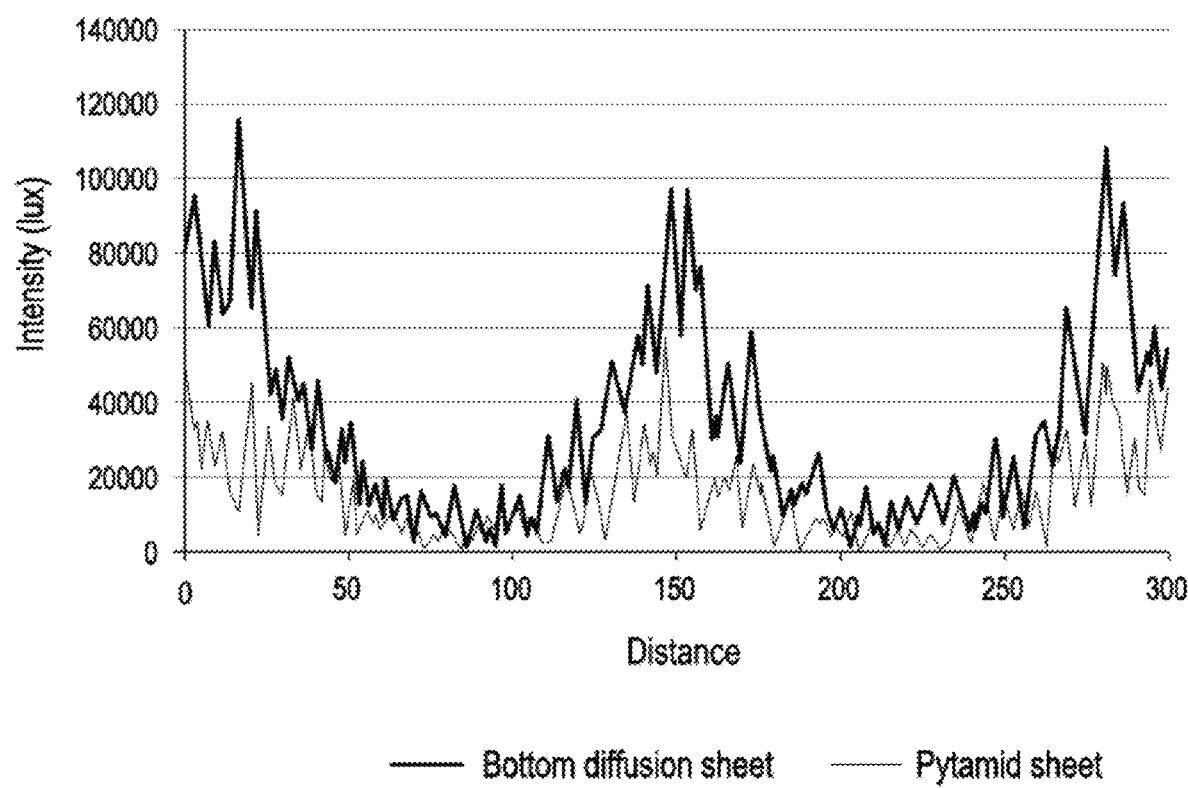
FIG. 9 is a spectrum showing the optical characteristic between the liquid crystal display (LCD) device in the embodiment of FIG. 1 and the liquid crystal display (LCD) devices in the embodiments of FIG. 2 to FIG. 6B.

FIG. 8A and FIG. 8B are images showing the optical characteristic between the liquid crystal display (LCD) device 1 in the embodiment of FIG. 1 and the liquid crystal display (LCD) devices 1 in the embodiments of FIG. 2 to FIG. 6B. FIG. 9 is a spectrum showing the optical characteristic between the liquid crystal display (LCD) device 1 in the embodiment of FIG. 1 and the liquid crystal display (LCD) devices 1 in the embodiments of FIG. 2 to FIG. 6B. FIG. 9 may also be a spectrum showing the intensity for FIGS. 8A and 8B.

Here, FIG. 8A may show the results of the intensity measurement for examining the hotspot visibility (HSV) depending on the presence of the light source 11a in the liquid crystal display (LCD) device 1 including the diffusion sheet 14 disclosed in the embodiment of FIG. 1. FIG. 8B may show the results of the intensity measurement for examining the hotspot visibility (HSV) depending on the presence of the light source 11a in the liquid crystal display (LCD) device 1 including the optical film 100 disclosed in the embodiments of FIGS. 2 to 6B. In FIG. 8A, it can be confirmed that a plurality of light sources 11a spaced apart at a predetermined interval is visible. In comparison, in FIG. 8B, it can be confirmed that the diffusivity is increased because the light sources 11a appear somewhat blurred compared to FIG. 8A thereby visibility being lowered (the degree of shielding being lowered) and the distribution of dark areas 11b between the light sources 11a being reduced. Referring to FIG. 8A, FIG. 8B, and FIG. 9 together, it can be confirmed from the respective result of the intensity measurement in the embodiment of FIG. 1 and the embodiments of FIG. 2 to FIG. 6B that the shielding effect was improved for the optical film 100 in the embodiments of FIG. 2 to FIG. 6B.

Figure 10A:
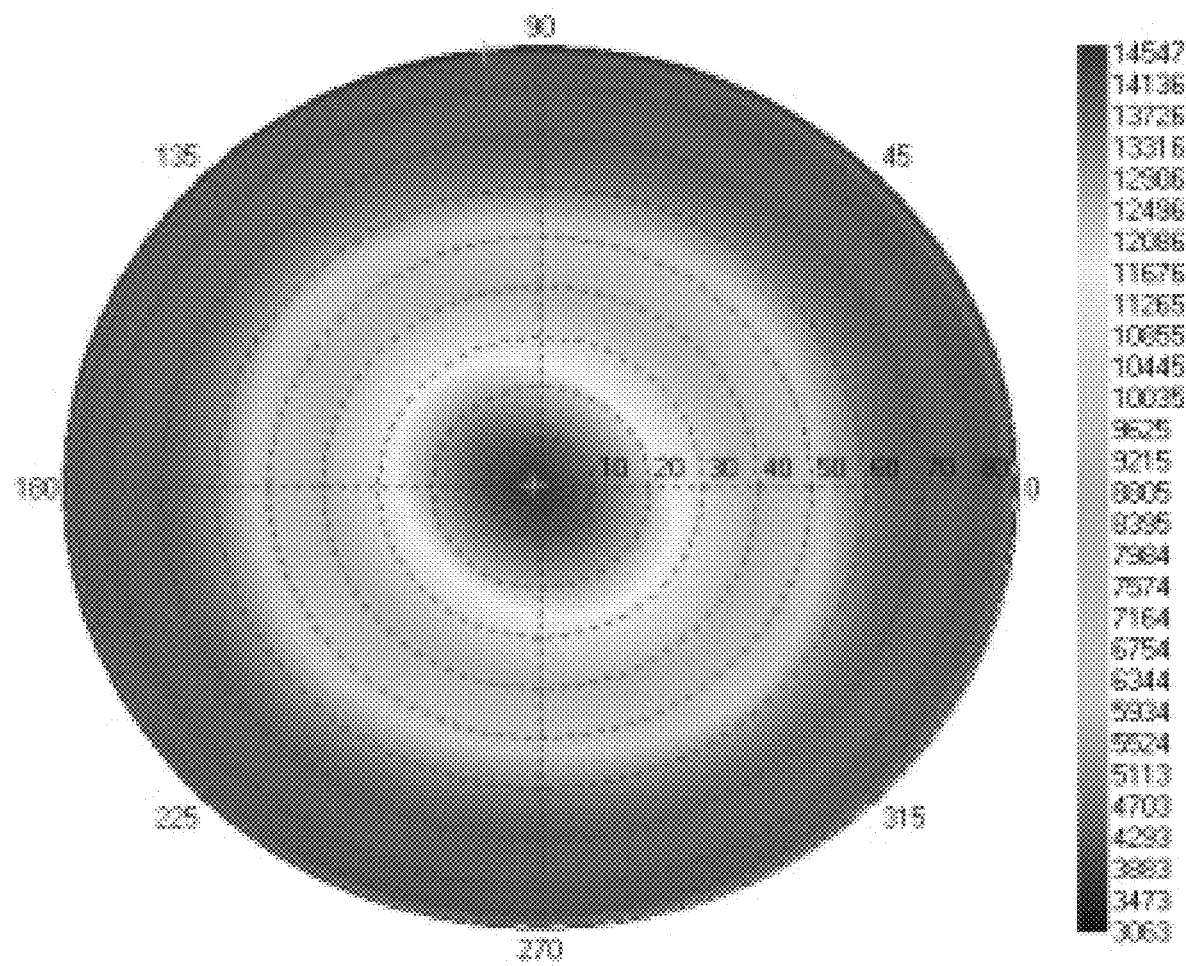
FIG. 10A and FIG. 10B are diagrams showing another optical characteristic between the liquid crystal display (LCD) device in the embodiment of FIG. 1 and the liquid crystal display (LCD) devices in the embodiments of FIG. 2 to FIG. 6B.
Figure 10B:
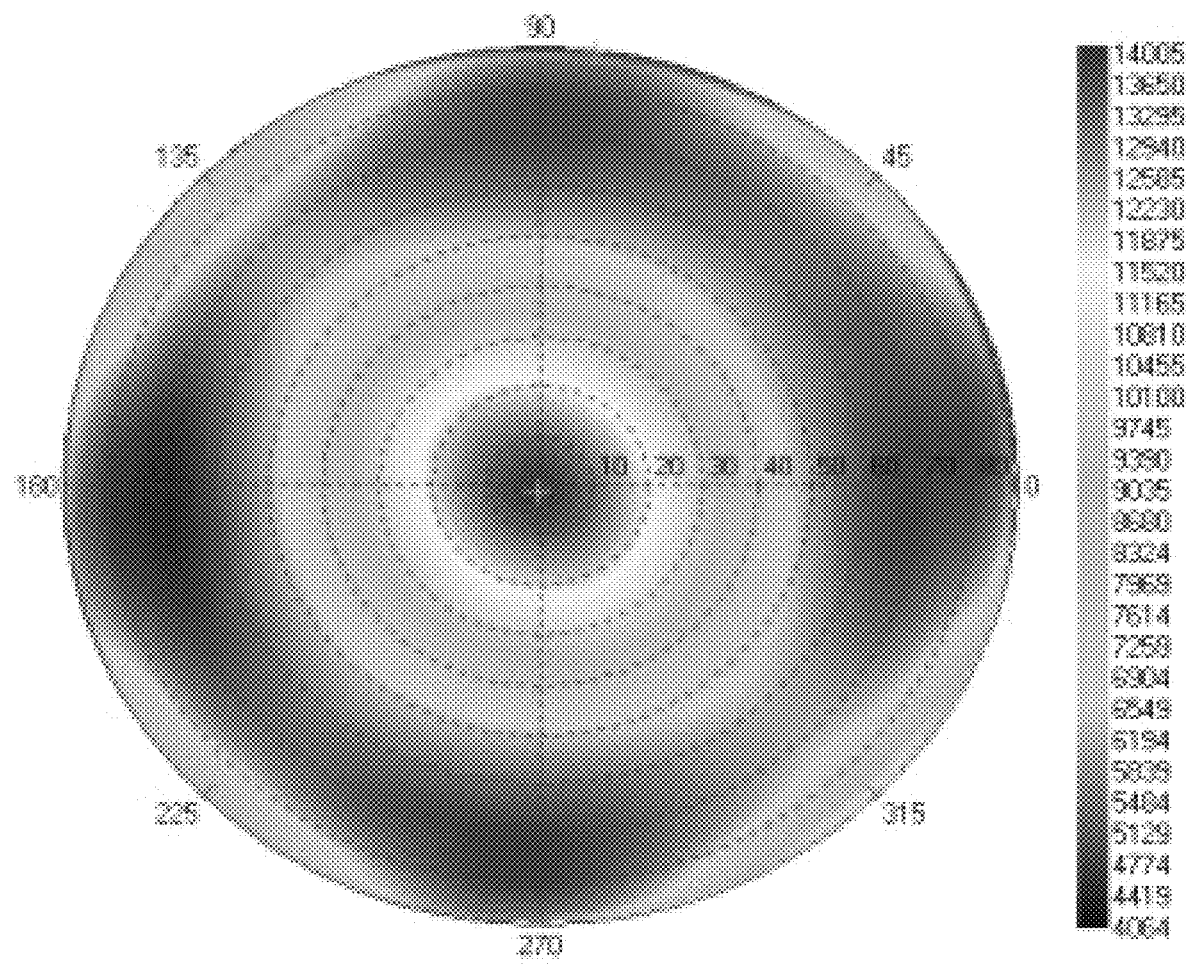
Figure 11:
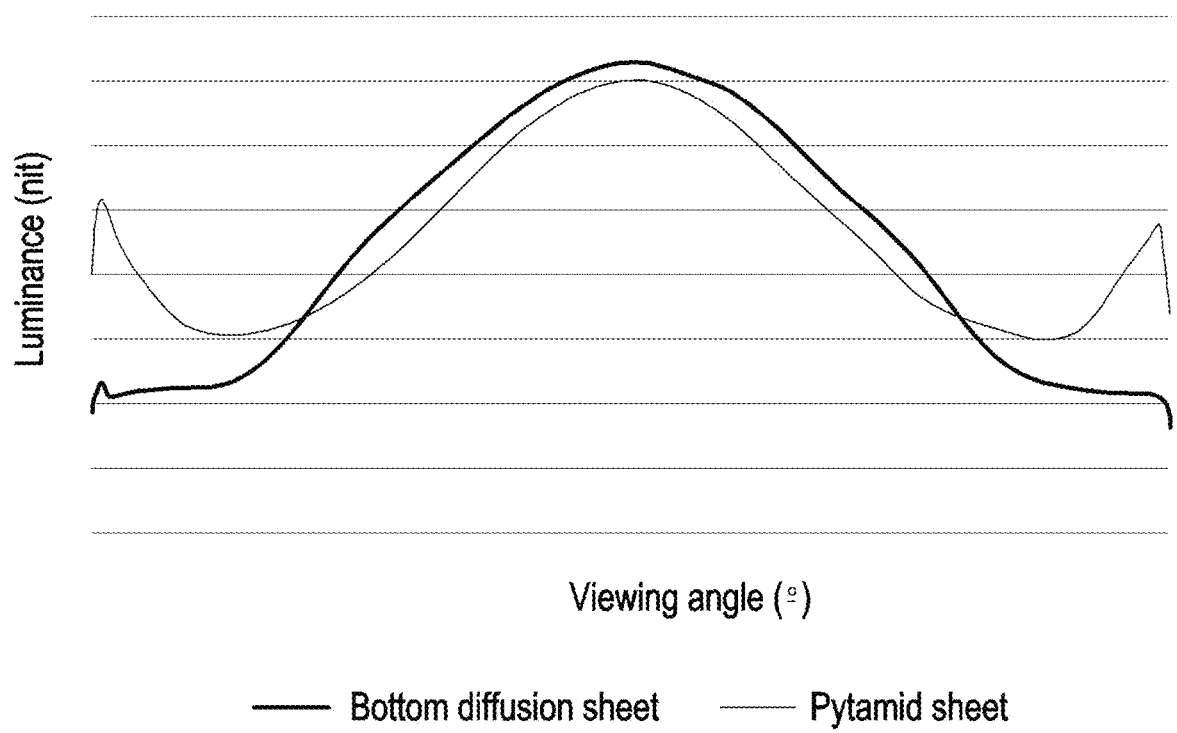
FIG. 11 is a spectrum showing another optical characteristic between the liquid crystal display (LCD) device in the embodiment of FIG. 1 and the liquid crystal display (LCD) devices in the embodiments of FIG. 2 to FIG. 6B.

Here, FIG. 10A and FIG. 10B are diagrams showing another optical characteristic between the liquid crystal display (LCD) device 1 in the embodiment of FIG. 1 and the liquid crystal display (LCD) devices 1 in the embodiments of FIG. 2 to FIG. 6B. FIG. 11 is a spectrum showing another optical characteristic between the liquid crystal display (LCD) 1 device in the embodiment of FIG. 1 and the liquid crystal display (LCD) devices 1 in the embodiments of FIG. 2 to FIG. 6B. FIG. 11 may be a spectrum showing a viewing angle for FIG. 10A and FIG. 10B.

Here, FIG. 10A may show the viewing angle distribution and the brightness measurement at a point P1 for the liquid crystal display (LCD) device 1 including the diffusion sheet 14 disclosed in the embodiment of FIG. 1. FIG. 10B may show the viewing angle distribution and the brightness measurement at a point P2 for the liquid crystal display (LCD) devices 1 including the optical film 100 disclosed in the embodiments of FIG. 2 to FIG. 6B. In FIGS. 10A and 10B, the brightness may be displayed as shown in various color distributions. Referring to FIGS. 10A and 10B, it can be confirmed that the brightness at the center is high and the brightness is gradually decreased from the center to the periphery. However, in FIG. 10B, it can be confirmed that the brightness is increased from the periphery to the edge.

Referring to FIG. 10A, FIG. 10B, and FIG. 11 together, it can be confirmed from the respective result of the viewing angle and the brightness measurement in the embodiment of FIG. 1 and the embodiments of FIG. 2 to FIG. 6B that the brightness became high in the viewing angle where it was larger than +59° or smaller than −59° for the optical film 100 in the embodiments of FIG. 2 to FIG. 6B. In other words, the optical film 100 in the embodiments of FIG. 2 to FIG. 6B may perform better brightness performance in a specific viewing angle range over the embodiment of FIG. 1.

The optical film of various embodiments of the present invention described above and the backlight unit including the optical film are not limited to the above-described embodiments and drawings. Moreover, various substitutions, modifications, and changes are possible for those skilled in the art within the technical scope of the present invention. The effects that can be obtained from the present invention are not limited to the effects mentioned above, and other effects not mentioned can be clearly understood by those skilled in the art from the description above.

What is claimed is:

1. An optical film comprising:
a first sheet including a first base portion; a pyramid pattern layer wherein a plurality of pyramid patterns is formed on one surface of the first base portion; and a first diffusion layer wherein a plurality of first optical protrusion patterns formed on the other surface of the first base portion;
a second sheet disposed over the first sheet and including a second base portion; a first prism pattern layer wherein a plurality of first prism patterns is formed on one surface of the second base portion; and a second diffusion layer wherein a plurality of second optical protrusion patterns having adhesiveness are formed on the other surface of the second base portion; and
a third sheet disposed over the second sheet and including a third base portion; a second prism pattern layer wherein a plurality of second prism patterns is formed on one surface of the third base portion; and a third diffusion layer wherein a plurality of third optical protrusion patterns having adhesiveness are formed on the other surface of the third base portion,
wherein the pyramid pattern layer is formed to have a refractive index greater than or equal to a refractive index of the first diffusion layer,
wherein a haze value of the first diffusion layer is 15% or higher; and
wherein the first sheet and the second sheet are laminated by the second optical protrusion patterns having adhesiveness of the second diffusion layer, and the second sheet and the third sheet are laminated by the third optical protrusion patterns having adhesiveness of the third diffusion layer.

2. The optical film of claim 1, wherein the plurality of first optical protrusion patterns of the first diffusion layer are configured to be a matte pattern.

3. The optical film of claim 1, wherein the plurality of first optical protrusion patterns of the first diffusion layer are configured to be a reverse prism pattern.

4. The optical film of claim 1, wherein the plurality of pyramid patterns of the pyramid pattern layer are configured to be intaglio.

5. The optical film of claim 1, wherein a perpendicular cross-section of the plurality of pyramid patterns which is parallel to a height direction of the optical film is an isosceles triangle.

6. The optical film of claim 1, wherein a vertex angle of the plurality of pyramid patterns of the pyramid pattern layer is in the vertex angle range of 60° or larger to 160° or smaller.

7. The optical film of claim 6, wherein a vertex angle of the plurality of pyramid patterns of the pyramid pattern layer is in the vertex angle range of 80° or larger to 130° or smaller.

8. The optical film of claim 1, wherein a deviation between a refractive index of the pyramid pattern layer and a refractive index of the second diffusion layer is 0.05 or less.

9. The optical film of claim 1, wherein a deviation between a refractive index of the first prism pattern layer and a refractive index of the third diffusion layer is 0.05 or larger.

10. The optical film of claim 1, wherein a pitch of the pyramid pattern layer is formed to have a predetermined multiple deviation from an integer multiple of a pitch of the first prism pattern layer and a pitch of the second prism pattern layer.

11. An optical film comprising:
a base portion; a pyramid pattern layer wherein a plurality of pyramid patterns having a vertex angle being in the vertex angle range of 60° or larger to 160° or smaller is formed on one surface of the base portion; and a diffusion layer wherein a plurality of optical protrusion patterns formed on the other surface of the base portion,
wherein the pyramid pattern layer is formed to have a refractive index greater than or equal to a refractive index of the diffusion layer, and
wherein a haze value of the diffusion layer is 15% or higher.

12. The optical film of claim 11, wherein the plurality of optical protrusion patterns of the diffusion layer are configured to be a matte pattern.

13. The optical film of claim 11, wherein the plurality of optical protrusion patterns of the diffusion layer are configured to be a reverse prism pattern.

14. The optical film of claim 11, wherein a vertex angle of the plurality of pyramid patterns of the pyramid pattern layer is in the vertex angle range of 80° or larger to 130° or smaller.

15. The optical film of claim 11, wherein the plurality of pyramid patterns of the pyramid pattern layer are configured to be intaglio.

16. A backlight unit comprising:
a light source;
a color conversion sheet; and
an optical film disposed over the color conversion sheet and further comprising:
a fourth sheet including a fourth base portion; a pyramid pattern layer wherein a plurality of pyramid patterns with a vertex angle being in the vertex angle range of 60° or larger to 160° or smaller is formed on one surface of the fourth base portion; and a fourth diffusion layer wherein a plurality of fourth optical protrusion patterns formed on the other surface of the fourth base portion;
a fifth sheet disposed over the fourth sheet and including a fifth base portion; a third prism pattern layer wherein a plurality of third prism patterns is formed on one surface of the fifth base portion; and a fifth diffusion layer wherein a plurality of fifth optical protrusion patterns having adhesiveness are formed on the other surface of the fifth base portion; and
a sixth sheet disposed over the fifth sheet and including a sixth base portion; a fourth prism pattern layer wherein a plurality of fourth prism patterns is formed on one surface of the sixth base portion; and a sixth diffusion layer wherein a plurality of sixth optical protrusion patterns having adhesiveness are formed on the other surface of the sixth base portion,
wherein the pyramid pattern layer is formed to have a refractive index greater than or equal to a refractive index of the fourth diffusion layer,
wherein a haze value of the fourth diffusion layer is 15% or higher; and
wherein the fourth sheet and the fifth sheet are laminated by the fifth optical protrusion patterns having adhesiveness of the fifth diffusion layer, and the fifth sheet and the sixth sheet are laminated by the plurality of sixth optical protrusion patterns having adhesiveness of the sixth diffusion layer.

17. The backlight unit of claim 16, wherein the plurality of fourth optical protrusion patterns of the fourth diffusion layer are configured to be a matte pattern.

18. The backlight unit of claim 16, wherein the plurality of fourth optical protrusion patterns of the fourth diffusion layer are configured to be a reverse prism pattern.

19. The backlight unit of claim 16, wherein the plurality of pyramid patterns of the pyramid pattern layer are configured to be intaglio.

20. The optical film of claim 16, wherein a pitch of the pyramid pattern layer is formed to have a predetermined multiple deviation from an integer multiple of a pitch of the third prism pattern layer and a pitch of the fourth prism pattern layer.

\* \* \* \* \*